United States Patent [19]
Tsujihara et al.

[11] Patent Number: 5,473,224
[45] Date of Patent: Dec. 5, 1995

[54] CONVERGENCE CORRECTION APPARATUS

[75] Inventors: Susumu Tsujihara; Ikunori Inoue, both of Osaka, Japan

[73] Assignee: Matsushita Electric Industrial Co., Ltd., Osaka, Japan

[21] Appl. No.: 141,327

[22] Filed: Oct. 21, 1993

[30]   Foreign Application Priority Data

Oct. 21, 1992   [JP]   Japan .................... 4-282659

[51] Int. Cl.$^6$ .................................................. H01J 29/51
[52] U.S. Cl. .............................. 315/368.18; 315/368.21; 315/368.22; 348/807
[58] Field of Search .................... 315/368.18, 368.21, 315/368.22, 368.12, 368.13; 348/807

[56]                References Cited

U.S. PATENT DOCUMENTS

| | | |
|---|---|---|
| 4,064,406 | 12/1977 | Tiemeijer . |
| 4,125,795 | 11/1978 | Ikebata et al. . |
| 4,239,142 | 12/1980 | Schonmeier et al. . |
| 4,524,308 | 6/1985 | Suzuki ................................. 315/368.18 |
| 4,581,563 | 4/1986 | Rockrohr ................................ 315/388 |
| 4,679,211 | 7/1987 | Kurz ........................................ 315/399 |
| 4,754,204 | 6/1988 | Ando et al. .............................. 315/367 |
| 4,893,065 | 1/1990 | Yamanaka ................................ 315/371 |
| 4,945,292 | 7/1990 | Ackerson et al. . |
| 4,980,614 | 12/1990 | Yamada et al. ......................... 315/367 |
| 5,212,552 | 5/1993 | Matsumoto ............................. 348/807 |

FOREIGN PATENT DOCUMENTS

| | | |
|---|---|---|
| 0474420 | 3/1992 | European Pat. Off. . |
| 52-122417 | 10/1977 | Japan . |
| 52-147016 | 12/1977 | Japan . |
| 55-61552 | 5/1980 | Japan . |
| 59-8114 | 2/1984 | Japan . |
| 60-83487 | 5/1985 | Japan . |
| 60-79893 | 5/1985 | Japan . |
| 62-11388 | 1/1987 | Japan . |
| 3-38797 | 6/1991 | Japan . |
| 4-5314 | 1/1992 | Japan . |
| 9103131 | 3/1991 | WIPO . |

*Primary Examiner*—Gregory C. Issing
*Attorney, Agent, or Firm*—Ratner & Prestia

[57]            ABSTRACT

A convergence correction apparatus comprises: a scanning waveform generating section (6) for generating a scanning waveform in synchronization with a sync signal for scanning an electron beam in a cathode ray tube (8); an amplitude control section (7) for controlling a raster size according to a scanning waveform generated by the scanning waveform generating means (6) with receipt of a control signal; and a convergence correction waveform generating section (5) for generating a correction waveform for performing a convergence correction according to the scanning waveform and the control signal. Therefore, the apparatus can automatically follow signal sources having different input scanning frequencies and different aspect ratios thereby to obviate the need for complicated adjustment in each mode and remarkably reducing the time necessary for the adjustment.

3 Claims, 22 Drawing Sheets

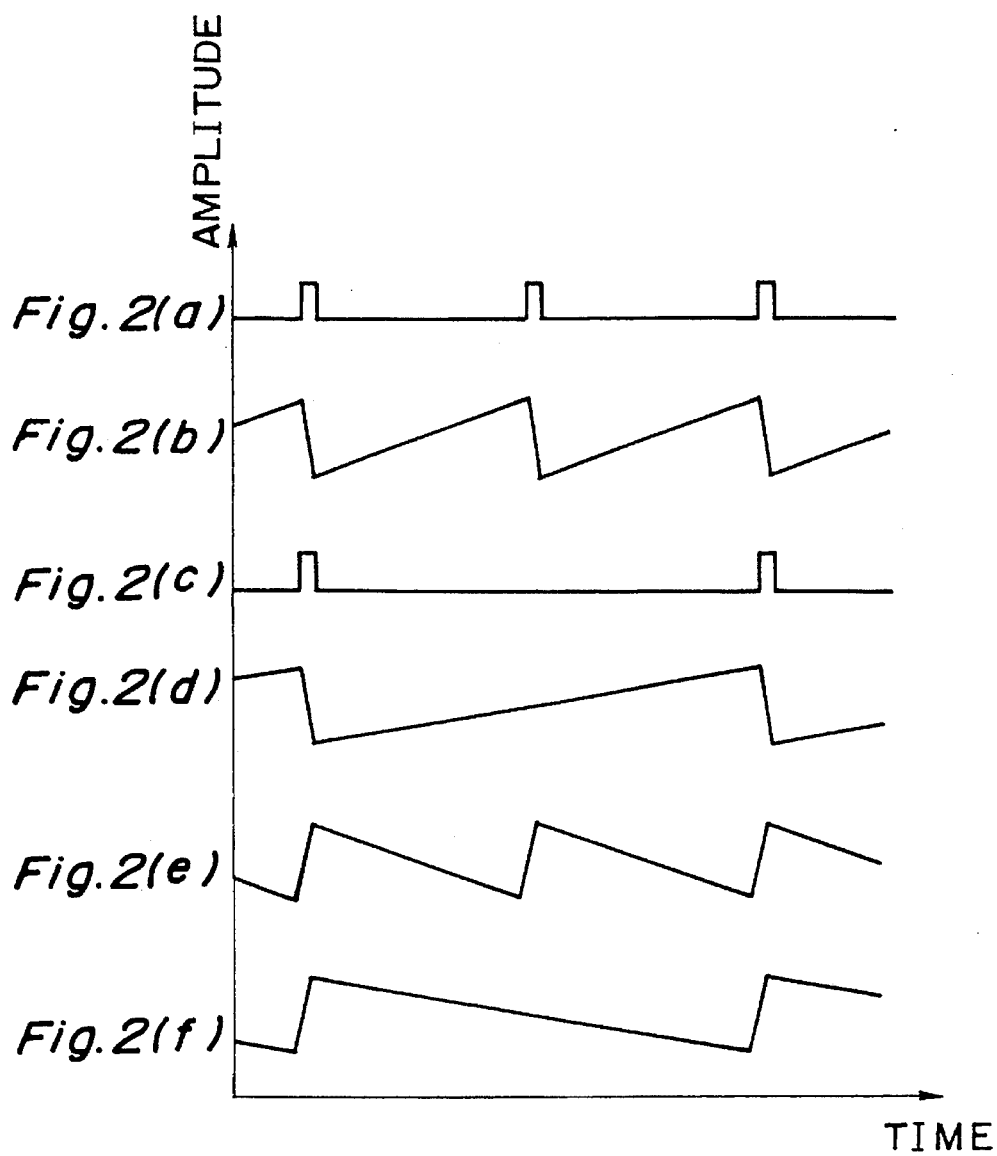
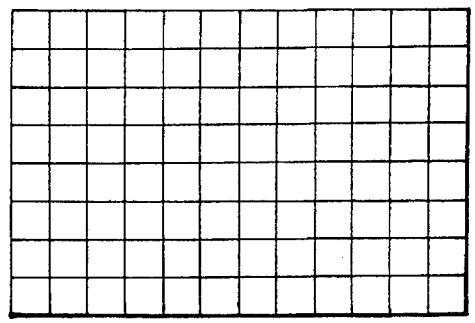
Fig. 3

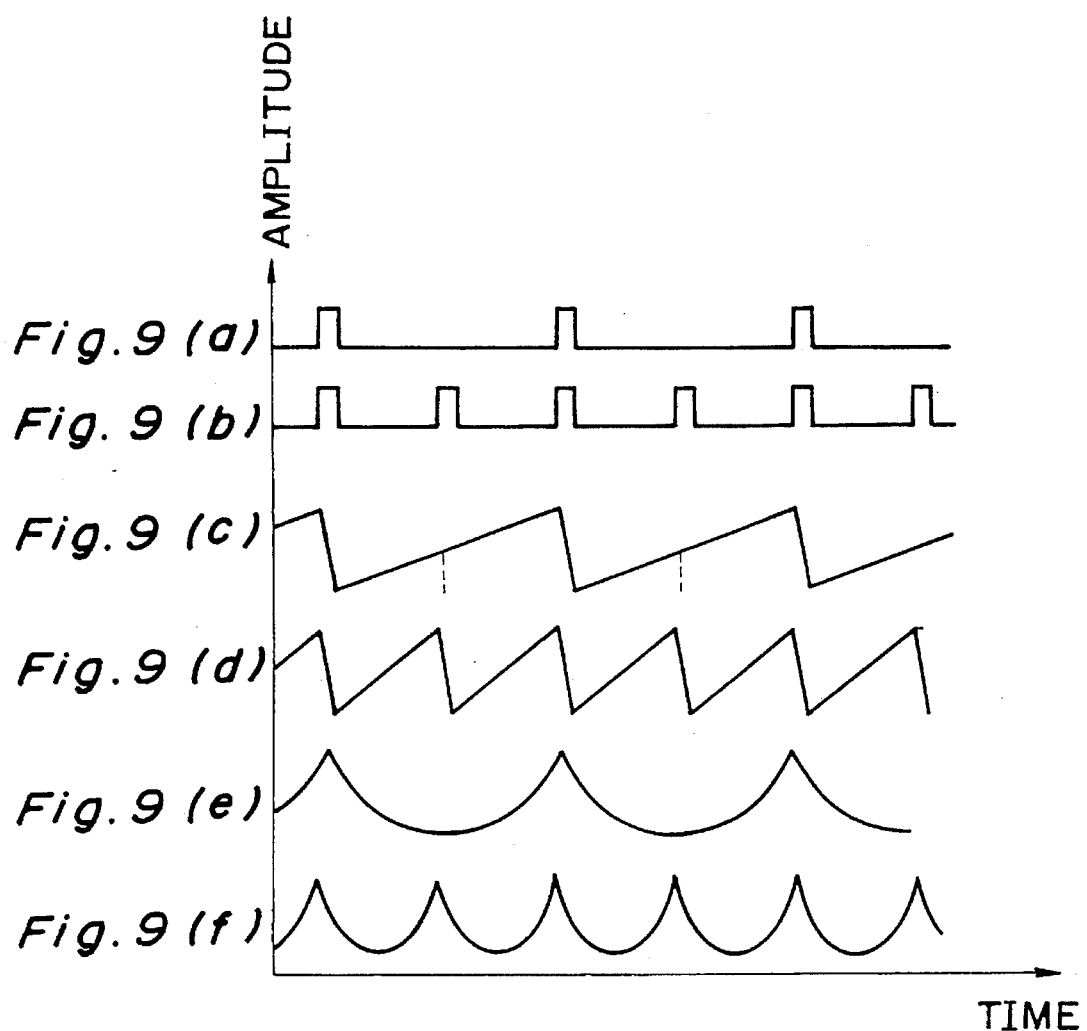

SAWTOOTH WAVEFORM GENERATOR CIRCUIT
Fig. 10(a)
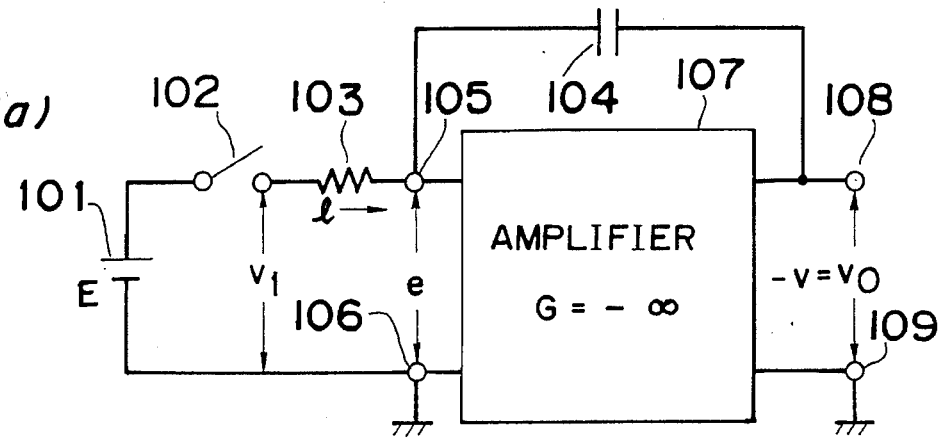
Fig. 10(b-1)
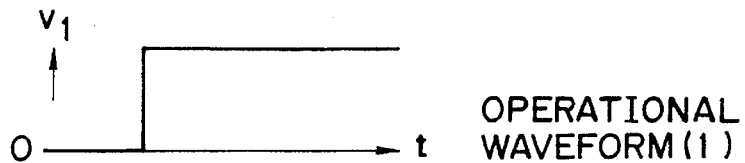
OPERATIONAL WAVEFORM (1)
Fig. 10(b-2)
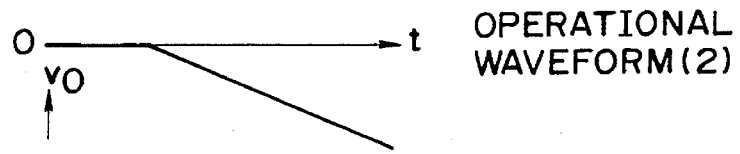
OPERATIONAL WAVEFORM (2)
Fig. 10(c)
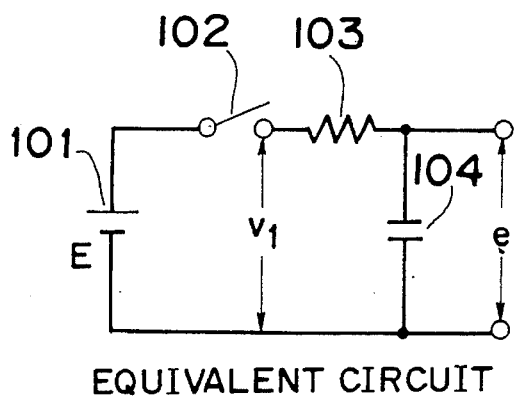
EQUIVALENT CIRCUIT

Fig.13(1-A)
VERTICAL SAWTOOTH WAVEFORM
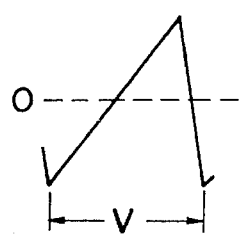
Fig.13(1-B)
VERTICAL AMPLITUDE
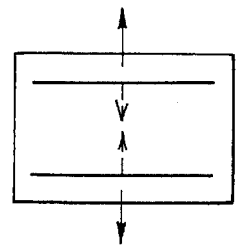
V.conv.
Fig.13(1-C)
ORTHOGONAL CORRECTION (V. line)
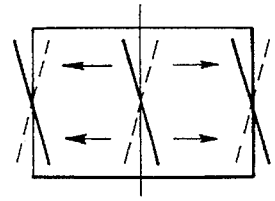
H.conv.
Fig.13(2-A)
VERTICAL PARABOLA WAVEFORM
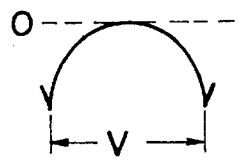
Fig.13(2-B)
VERTICAL LINEARITY
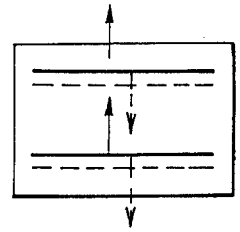
V.conv.
Fig.13(2-C)
VERTICAL LINE CURVE CORRECTION
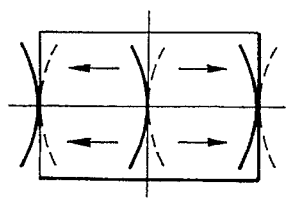
H.conv.

Fig.13(3-A)
HORIZONTAL SAWTOOTH
WAVEFORM
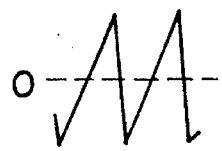
Fig.13(3-B)
ORTHOGONAL CORRECTION
(H. line)
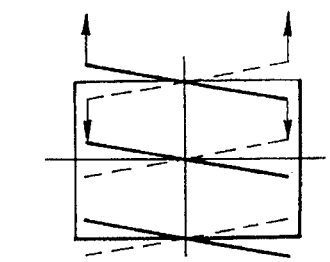
Fig.13(3-C)
H. SIZE
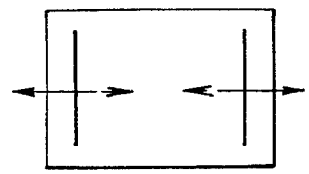
V.conv.
H.conv.
Fig.13(4-A)
HORIZONTAL PARABOLA
WAVEFORM
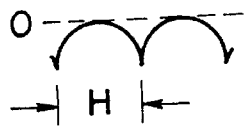
Fig.13(4-B)
HORIZONTAL LINE
CURVE CORRECTION
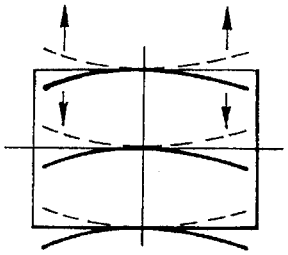
Fig.13(4-C)
HORIZONTAL LINEARITY
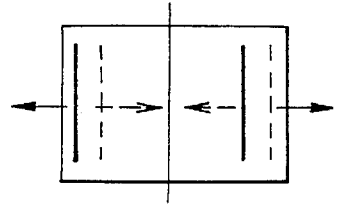
V.conv.
H.conv.

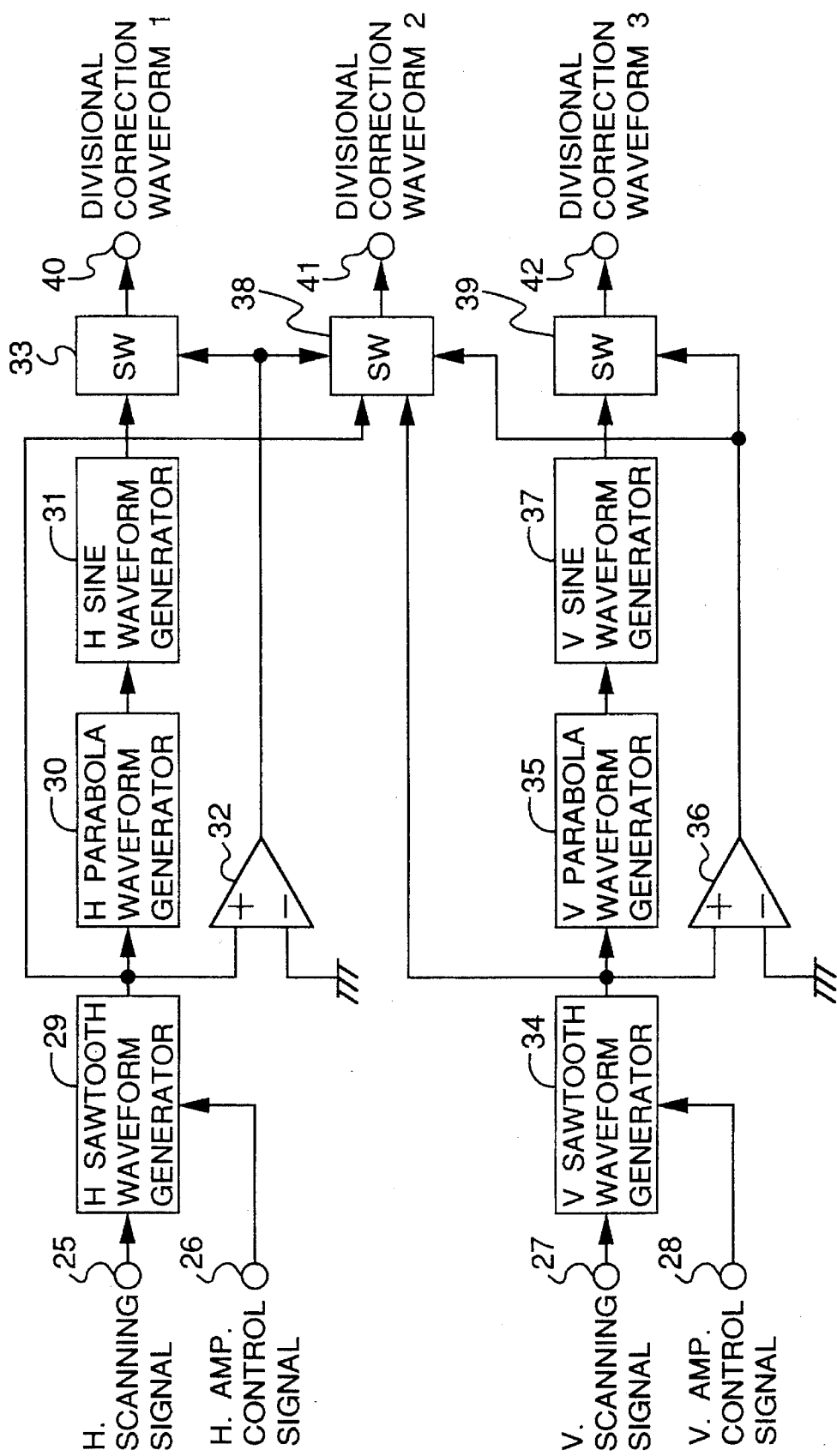
Fig. 14 DIVISIONAL CORRECTION WAVEFORM GENERATOR

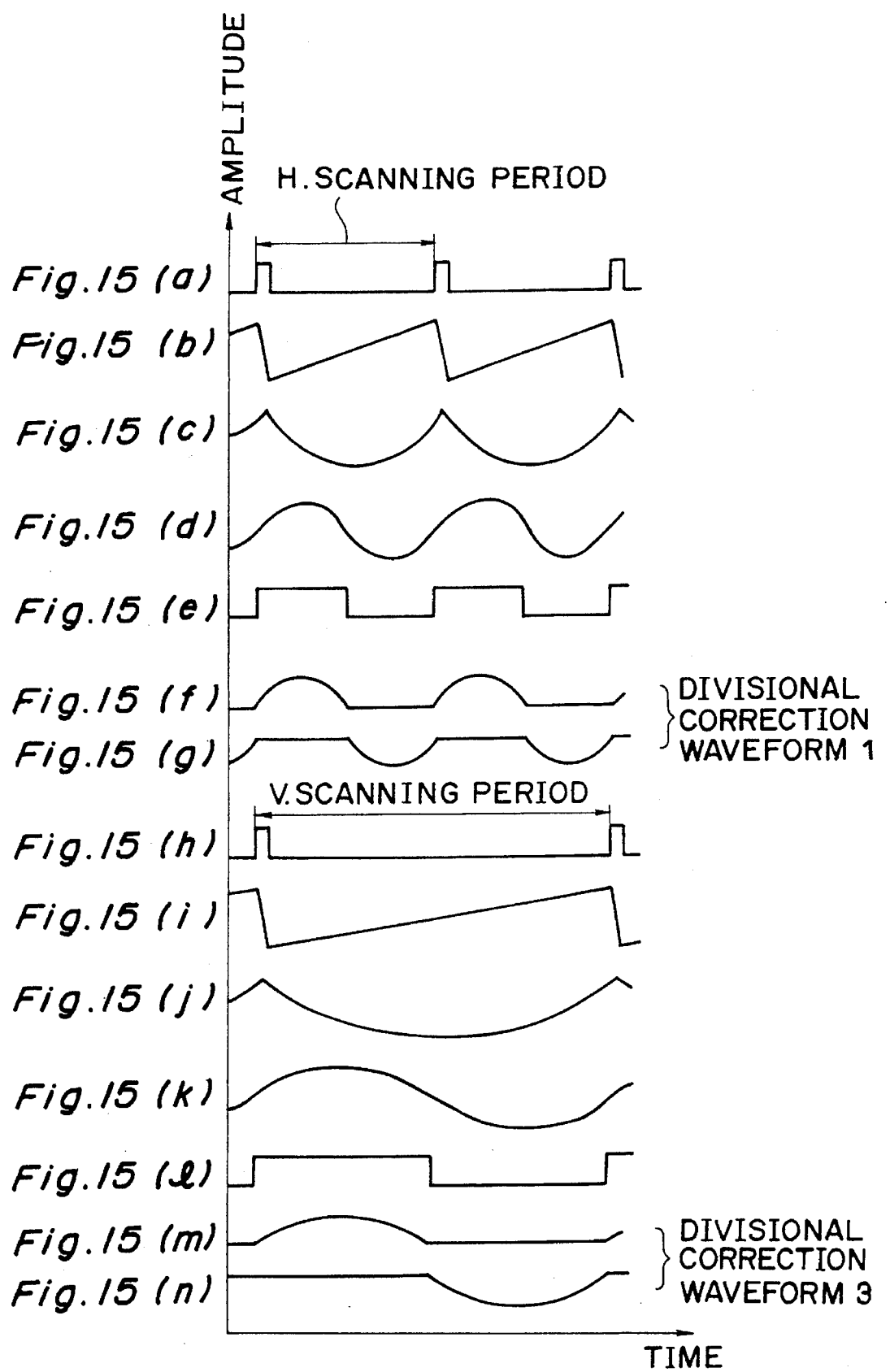

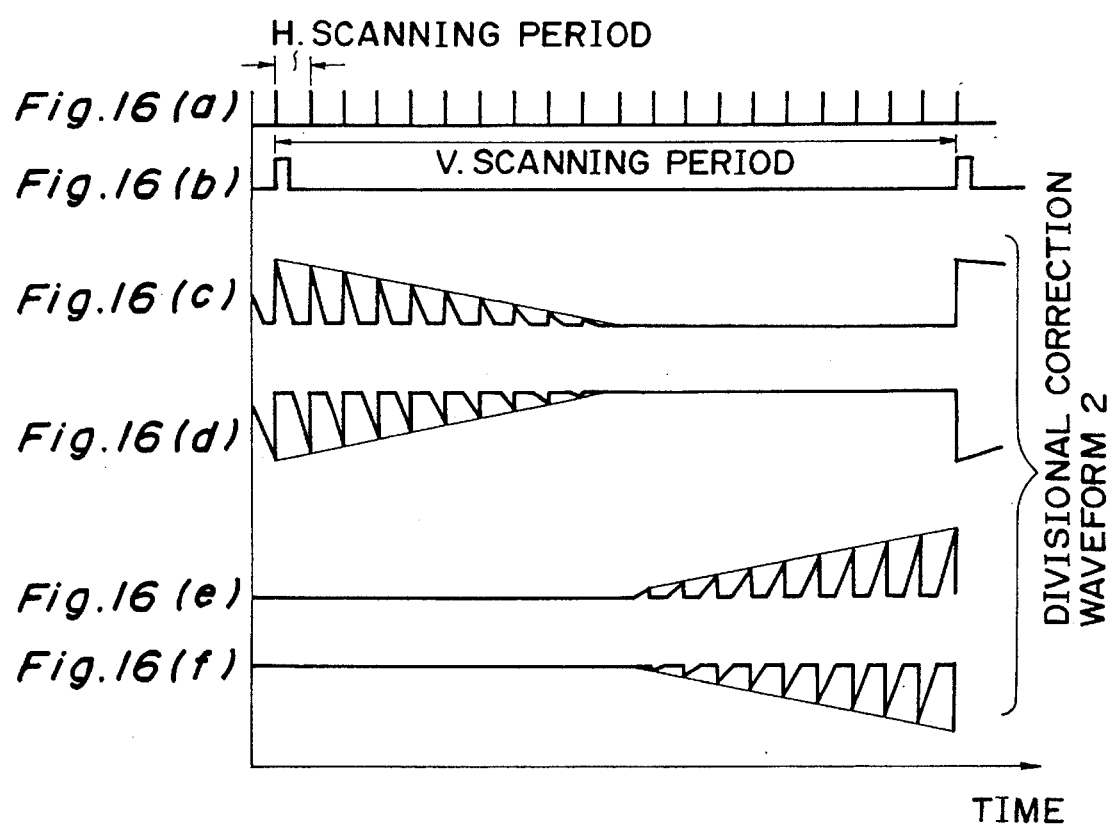

● ADJUSTMENT POINT

CONVERGENCE CORRECTION APPARATUS

BACKGROUND OF THE INVENTION

1. Field of the Invention

The present invention relates to a convergence correction apparatus for use in a color television receiver, and more particularly to a convergence correction apparatus capable of performing an automatic convergence correction with high accuracy by digitally controlling various correction waveforms.

2. Description of the Prior Art

Generally in a video projector, three projection tubes are used for applying light beams of three primary colors red (R), green (G) and blue (B) for expanding and projecting a video image picture onto a screen, where the incident projection angles (hereinafter, referred to as, "convergence angle") of the light beams from the projection tubes with respect to the screen are different from each other, resulting in that color deviation, i.e., misconvergence may occur in the picture displayed on the screen. Convergence correction to such misconvergence has been implemented by such a system that an analog-like correction waveform is created in synchronization with horizontal and vertical scanning periods so that the amplitude and shape of the analog-like correction waveform are varied to be adjusted for the convergence correction. However, such a conventional system has been accompanied by a problem in the viewpoint of correction accuracy.

The conventional adjustment system mentioned above has been also accompanied by another problem that much time is required in operation because the correction is manually performed while visually observing the misconvergence on the screen.

In order to solve this problem, the Japanese Patent Unexamined Laid-Open No. 8114/1984 discloses a digital convergence apparatus capable of convergence correction with high accuracy. Besides, the Japanese Patent Publication No. 38797/1991 discloses a digital convergence apparatus for performing an automatic correction. The Japanese Patent Publication No. 5314/1992 discloses a digital convergence apparatus capable of coping with various scanning frequencies. The Japanese Patent Unexamined Laid-Open No. 11388/1987 discloses a digital convergence apparatus capable of coping with various aspect ratios. The Japanese Patent Unexamined Laid-Open Nos. 122417/1977, 147016/1977, and 79893/1985 each discloses a method of performing a convergence correction by dividing an analog waveform.

One of such conventional convergence correction apparatuses for use in a video projector is described below reference to FIG. 26.

Referring to FIG. 26, the apparatus includes a projection cathode-ray tube 8, a convergence yoke 9, a deflection yoke 10, a screen 86, and a projection lens 87.

A video signal is applied to a video circuit 81 through a video input terminal 1, where the input video signal is amplified to an appropriate amplitude to drive the projection cathode-ray tube 8. The video circuit 81 serves as the conventional television receiver in the normal mode, whereas it displays, as shown in FIG. 27, on the display screen a crosshatch signal fed from a digital convergence circuit 82 during a convergence adjustment operation mode.

In the digital convergence of the crosshatch signal, correction data of adjustment points displayed on the screen is stored and interpolation of the correction data is performed among the adjustment points to create a correction waveform. Accordingly, correction can be effected for each adjustment point independently, so that high-accuracy correction can be implemented. Electron beams are scanned by means of a deflection circuit 83 and the deflection yoke 10 in the projection cathode-ray tube 8 in accordance with a sync. signal applied through a sync. signal input terminal 2. Although a single projection cathode-ray tube 8 is shown in FIG. 26, normally used are three projection cathode-ray tubes for primary three colors of R, G and B.

An adjustment pattern detector 85 such as a camera performing photodetection, detects a crosshatch pattern projected on the screen 86. The detection signal of the crosshatch pattern is fed from the detector 85 to an adjustment-point detector circuit 84. The adjustment-point detector circuit 84 detects convergence deviation of each adjustment point and adjusts the amount of correction of the digital convergence circuit 82 according to the resultant detection signal, thus automatically accomplishing the convergence adjustment.

As described above, by detecting the misconvergence in the picture displayed on the screen with the detector camera 85 and using the resulting detection signal to control correction data, there can be achieved an automatically adjustable high-accuracy convergence correction apparatus.

In such a conventional convergence correction apparatus as described above, it is required to input misconvergence correction data of each adjustment point in each mode in order to cope with signal sources having different input scanning frequencies and different aspect ratios. Therefore, the conventional apparatus has such problems that it requires much time for the adjustment and significantly increased memory capacity and circuit scale due to the necessity of a particular adjustment function for each mode.

SUMMARY OF THE INVENTION

Accordingly, an essential objective of the present invention is to provide a convergence correction apparatus capable of automatically following convergence correction signal sources having different input scanning frequencies and different aspect ratios to remarkably reduce the time necessary for adjustment by forming a convergence correction waveform according to a scanning waveform corresponding to a scanning frequency and a raster size.

In order to achieve the above-mentioned objective, a first inventive convergence correction apparatus comprises: scanning waveform generating means for generating a scanning waveform with receipt of a sync signal for scanning an electron beam in a cathode ray tube; control means for controlling a raster size according to the scanning waveform generated by said scanning waveform generating means with receipt of a control signal; and correction waveform generating means for generating a correction waveform for performing a convergence correction according to the scanning waveform and the control signal, whereby convergence correction is formed in accordance with the scanning waveform corresponding to the scanning frequency and the raster size.

According to a first feature of the present invention, the apparatus can automatically follow convergence correction signal sources having different input scanning frequencies and different aspect ratios, thereby remarkably reducing the time necessary for the adjustment.

A second inventive convergence correction apparatus comprises: control means for controlling a raster size defined by a scanning waveform according to a control signal; fundamental correction waveform generating means for generating a fundamental correction waveform for correcting a convergence according to the scanning waveform and the control signal; memory means for storing amplitude-control data for amplitude-controlling the fundamental correction waveform; conversion means for a multiplication type digital-to-analog conversion of the amplitude-control data and the fundamental correction waveform; and correction waveform generation means for generating a correction waveform for performing convergence correction according to the resulting conversion signal, thereby digitally forming convergence correction data according to the scanning waveform corresponding to the scanning frequency and the raster size.

According to a second feature of the present invention, the apparatus can effect a stable high-accuracy convergence correction to easily achieve an automatic adjustment.

BRIEF DESCRIPTION OF THE DRAWINGS

These and other objects and features of the present invention will become apparent from the following description taken in conjunction with the preferred embodiment thereof with reference to the accompanying drawings, in which:

FIGS. 2(a), 2(b), 2(c), 2(d), 2(e) and 2(f) are charts of waveforms for explaining the operation of the first embodiment with respect to a scanning frequency;

FIG. 3 is a view of a display screen for explaining the operation of the first embodiment with respect to a scanning frequency;

FIGS. 9(a), 9(b), 9(c), 9(d), 9(e), and 9(f) are charts of waveforms for explaining the operation of the fundamental correction waveform generation section of the first embodiment;

FIG. 10(a) is a circuit arrangement for explaining a sawtooth waveform generating section composed of a mirror integration circuit according to the present invention;

FIGS. 10(b-1) and 10(b-2) are charts each for explaining an operational waveform of the circuit arrangement of FIG. 10(a);

FIG. 10(c) is a diagram showing an equivalent circuit of FIG. 10(a);

FIGS. 13(1-A), 13(1-B), 13(1-C); 13(2-A), 13(2-B), 13(2-C); 13(3-A), 13(3-B), 13(3-C); and 13(4-A), 13(4-B), 13(4-C) are schematic diagrams each showing correction variations with respect to correction waveforms of the first embodiment;

FIG. 14 is a block diagram of a divisional correction waveform generation section of the first embodiment;

FIGS. 15(a), 15(b), 15(c), 15(d), 15(e), 15(f), 15(g), 15(h), 15(i), 15(j), 15(k), 15(l), 15(m), and 15(n) are charts of waveforms for explaining the operation of the divisional correction waveform generation section of the first embodiment;

FIGS. 16(a), 16(b), 16(c), 16(d), 16(e) and 16(f) are charts of waveforms for explaining the operation of the divisional correction waveform generation section of the first embodiment;

DETAILED DESCRIPTION OF THE PREFERRED EMBODIMENTS

Figure 1:
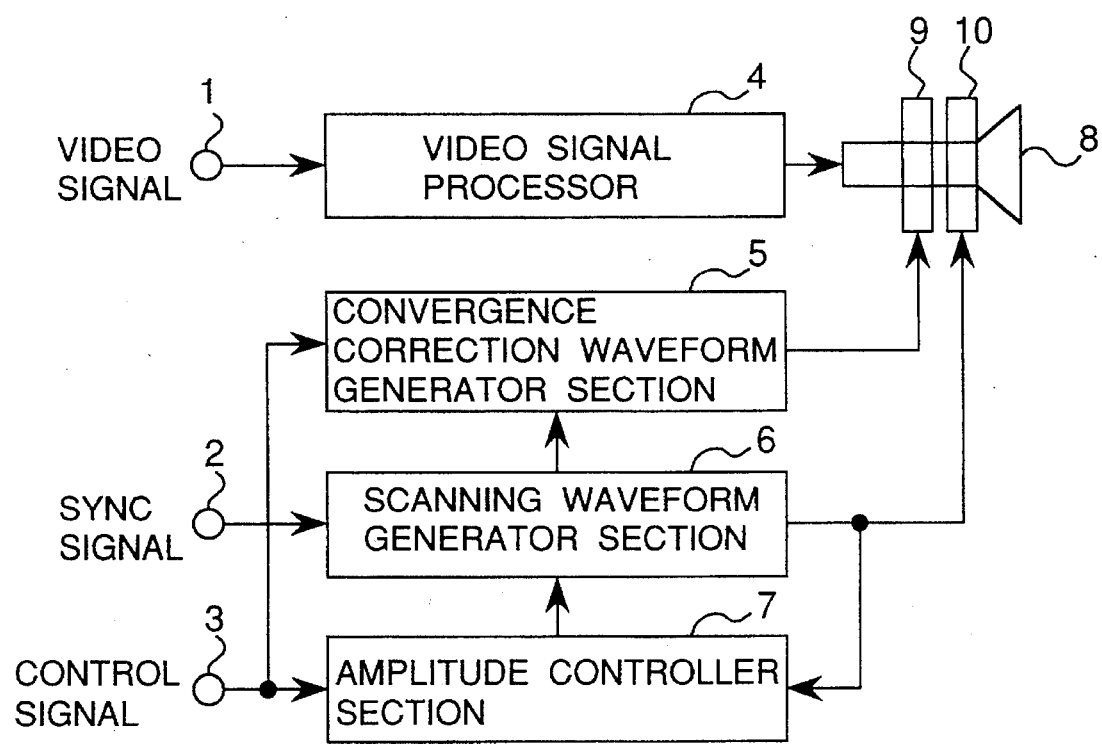
FIG. 1 is a block diagram showing an image correction apparatus including a convergence correction apparatus in accordance with a first embodiment of the present invention.

The following describes preferred embodiments of the present invention with reference to the attached drawings. Before the description proceeds, it is to be noted here that similar parts are designated by the same reference numerals throughout the drawings.

Embodiment 1

FIG. 1 shows a block diagram of an image correction apparatus which includes a convergence correction apparatus in accordance with a first embodiment of the present invention.

Referring to FIG. 1, a video signal is input to a video signal processing section 4 through a video signal input terminal 1. The convergence correction apparatus is provided with a sync signal input terminal 2 for receiving a sync signal, and a control signal input terminal 3 for receiving a control signal for controlling a raster size according to various aspect ratios. The video signal processing section 4 amplifies the input video signal to a level required for driving a cathode ray tube 8. The cathode ray tube 8 is provided with a convergence yoke 9 and a deflection yoke 10.

The apparatus includes a convergence correction waveform generating section 5 for generating a convergence correction waveform for driving the convergence yoke 9 and further includes a scanning waveform generating section 6 for generating a scanning waveform for driving the deflection yoke 10. In the section 6, the scanning waveform is formed in synchronization with the sync signal applied through the input terminal 2 thereby to drive the deflection yoke 10. The convergence correction waveform generating section 5 receives the control signal applied through the input terminal 3 and the scanning waveform output from the scanning waveform generating section 6 so that the section 5 generates the convergence correction waveform according to the control signal and the scanning waveform to drive the convergence yoke 9. Reference numeral 7 denotes an amplitude control section which also receives the control signal entered through the input terminal 3 and the scanning waveform output from the scanning waveform generating section 6. The output signal of the section 7 is applied to the scanning waveform generating section 6 performing a feedback-control to have a regular raster size even when various signal sources having different scanning frequencies are used.

The following describes the operation of the image correction apparatus shown in FIG. 1 including the convergence correction apparatus of the first embodiment with reference to the operation waveforms as shown in FIGS. 2(a) to 2(f) and an image picture displayed on the display screen as shown in FIG. 3.

The input terminal 2 receives two kinds of sync signals having different scanning frequencies from each other as shown in FIGS. 2(a) and 2(c) alternatively and one of the input sync signals is supplied to the scanning waveform generating section 6. The amplitude control section 7 controls a power voltage (not shown) for driving the scanning waveform generating section 6 according to the scanning frequency of the scanning signal with receipt of the control signal so that the scanning waveform generating section 6 generates a regular deflection current of a sawtooth waveform having a regular amplitude as shown in FIGS. 2(b) and 2(d). The sawtooth waveform generated by the scanning waveform generating section 6 is supplied to the deflection yoke 10. The control signal applied through the input terminal 3 is fed to a reference voltage terminal of a comparator (which is referred later with reference to FIG. 8) provided in the convergence correction waveform generating section 5, thereby allowing to set the raster size according to the control signal.

The control signal input through the terminal 3 is applied to the convergence correction waveform generating section 5 for setting the raster size while another output signal of the scanning waveform generating section 6 which is formed according to the scanning frequency of the input sync signal is also applied to the convergence correction waveform generating section 5, whereby the section 5 forms convergence correction waveforms of sawtooth shapes each having a regular amplitude as shown in FIGS. 2(e) and 2(f) corresponding to the scanning frequencies and the raster size.

Accordingly, even when the scanning frequency differs between the two sync signals as shown in FIGS. 2(a) and 2(c), a correction waveform corresponding to the latter scanning frequency shown in FIG. 2(c) is automatically formed from the convergence correction data adjusted according to the former scanning frequency shown in FIG. 2(a). Therefore, a good convergence image display can be achieved on the display screen as shown by the cross hatching image picture in FIG. 3.

The following describes an operation in a case where the aspect ratio is varied, with reference to FIGS. 4, 5, 6 and 7.

Figure 4:
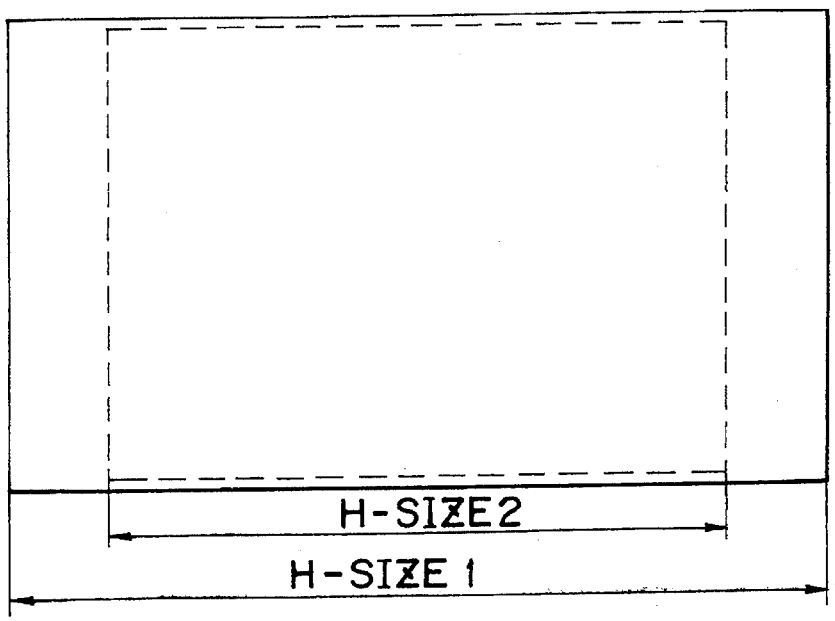
FIG. 4 is a view of a display screen for explaining an operation of the first embodiment with respect to an aspect ratio.
Figure 5:
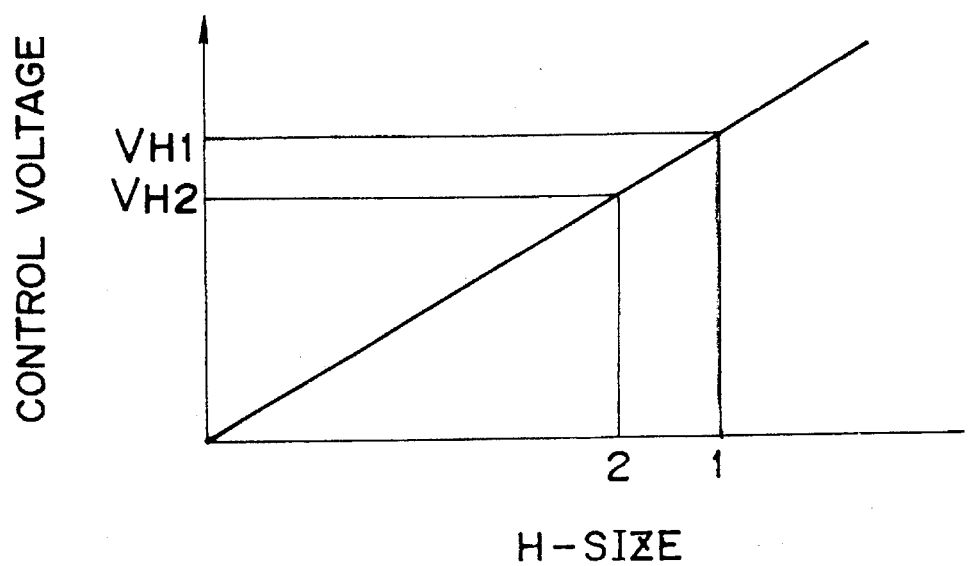
FIG. 5 is a graph showing a relation between a horizontal size (H size) and a control voltage for controlling the raster size.

Referring to FIGS. 4 and 5, when the aspect ratio is changed from 16:9(H-SIZE 1 as indicated by the solid line) to 4:3, i.e., 12:9(H-SIZE 2 as indicated by the dotted line), the H-SIZE 1 corresponds to a control voltage $VH_{H1}$, while the H-SIZE 2 corresponds to a control voltage $V_{H2}$ as shown in FIG. 5. Therefore, by inputting each of the above-mentioned control signals $V_{H1}$ and $V_{H2}$ to the input terminal 3, the corresponding aspect ratio as shown in FIG. 4 can be set.

Figure 6:
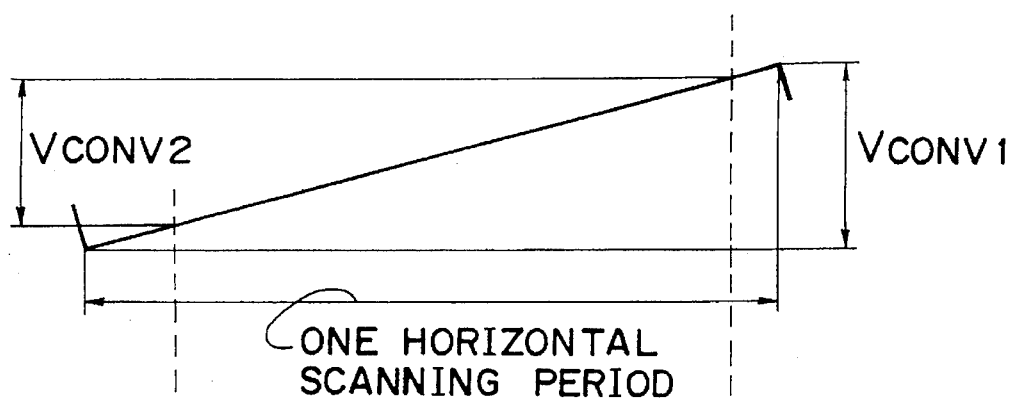
FIG. 6 is a chart of a waveform for explaining an operation of the first embodiment with respect to an aspect ratio.
Figure 7:
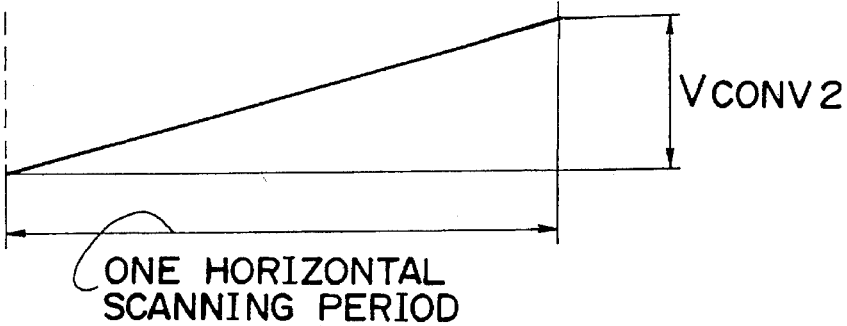
FIG. 7 is a chart of a waveform for explaining an operation of the first embodiment with respect to an aspect ratio.

In regard to a correction waveform generated from the convergence correction waveform generating section 5, a sawtooth waveform having an amplitude $V_{CONV1}$ as shown in FIG. 6 is generated when the aspect ratio is 16:9(H-SIZE 1 in FIG. 4), where the amplitude of the sawtooth waveform is linearly increased from zero to $V_{CONV2}$ in one horizontal scanning period. When the aspect ratio is 12:9(H-SIZE 2 in FIG. 4), a sawtooth waveform having an amplitude $V_{CONV2}$ as shown in FIG. 7 is generated, where the amplitude of the sawtooth waveform is linearly increased from zero to $V_{CONV2}$ in one horizontal scanning period. Each of the abovementioned convergence correction waveform signals is used for driving the convergence yoke 9 to perform the convergence correction. The correction waveform having the aspect ratio of 12:9(H-SIZE 2) as indicated by the dotted line in FIG. 4 is automatically formed based on the convergence correction data adjusted at the aspect ratio of 16:9(H-SIZE 1) as indicated by the solid line in FIG. 4. Therefore, a good convergence image picture can be achieved on the display screen even when the aspect ratio is varied.

The following describes a method of forming a fundamental correction waveform for convergence correction with reference to FIG. 8, FIGS. 9(a) through 9(f), FIGS. 10(a) through 10(c), and FIG. 11.

In order to clearly understand the present invention, an operation of a integration circuit for forming various correction waveforms is first generally described below with reference to FIGS. 10(a) through 10(c) and FIG. 11.

FIG. 10(a) shows a constitution of a sawtooth waveform generating circuit composed of a mirror integration circuit, FIG. 10(b) shows a chart of a waveform for explaining the operation of the integration circuit shown in FIG. 10(a), and FIG. 10(c) shows an equivalent circuit corresponding to the integration circuit shown in FIG. 10(a). Assuming that an amplifier 107 has its input impedance being infinite (∞) and its output impedance being 0, current i flowing through a resistor 103 is entirely supplied to a capacitor 104. Therefore, the following equations (1) to (3) are obtained:

$$e = v_c + v_o \qquad (1)$$

$$v_o = G_e \qquad (2)$$

$$v_c = 1/C \int i \, dt \qquad (3)$$

when eliminating $v_c$ and $v_o$ from Equations (1) through (3), obtained is Equation (4) as following:

$$e = \{1/(1-G)C\}\int i\, dt \quad (4)$$

Accordingly, the circuit constitution shown in FIG. 10(a) can be represented by the equivalent circuit shown in FIG. 10(c). In this arrangement having the amplifier 107, the capacitance C is made (1−G) times in appearance. Since the circuit of FIG. 10(c) is an RC integration circuit, the integration time constant τm is given by:

$$\tau m = (1-G)RC \quad (5)$$

When G is −∞, τm becomes ∞. Even when G is not −∞ but sufficiently large negative value (i.e., considerable τm≫t), the value of e in FIG. 10(c) is $v_c = (E/\tau) \cdot t$, where τ is replaced by τm to obtain Equation (6) as following:

$$e = (E/\tau m)t = \{E/(1-G)RC\}t \quad (6)$$

Accordingly, from Equations (2) and (6), the output $v_o$ is represented by the waveform shown in FIG. 10(b), which is represented by:

$$v_o = \{GE/(1-G)RC\}t = -(E/RC)t$$

where the equation represents formation of a sawtooth waveform. It is noted here from the above equation that the inclination of the output $v_o$ is due to the integration time constant τm.

Figure 11:
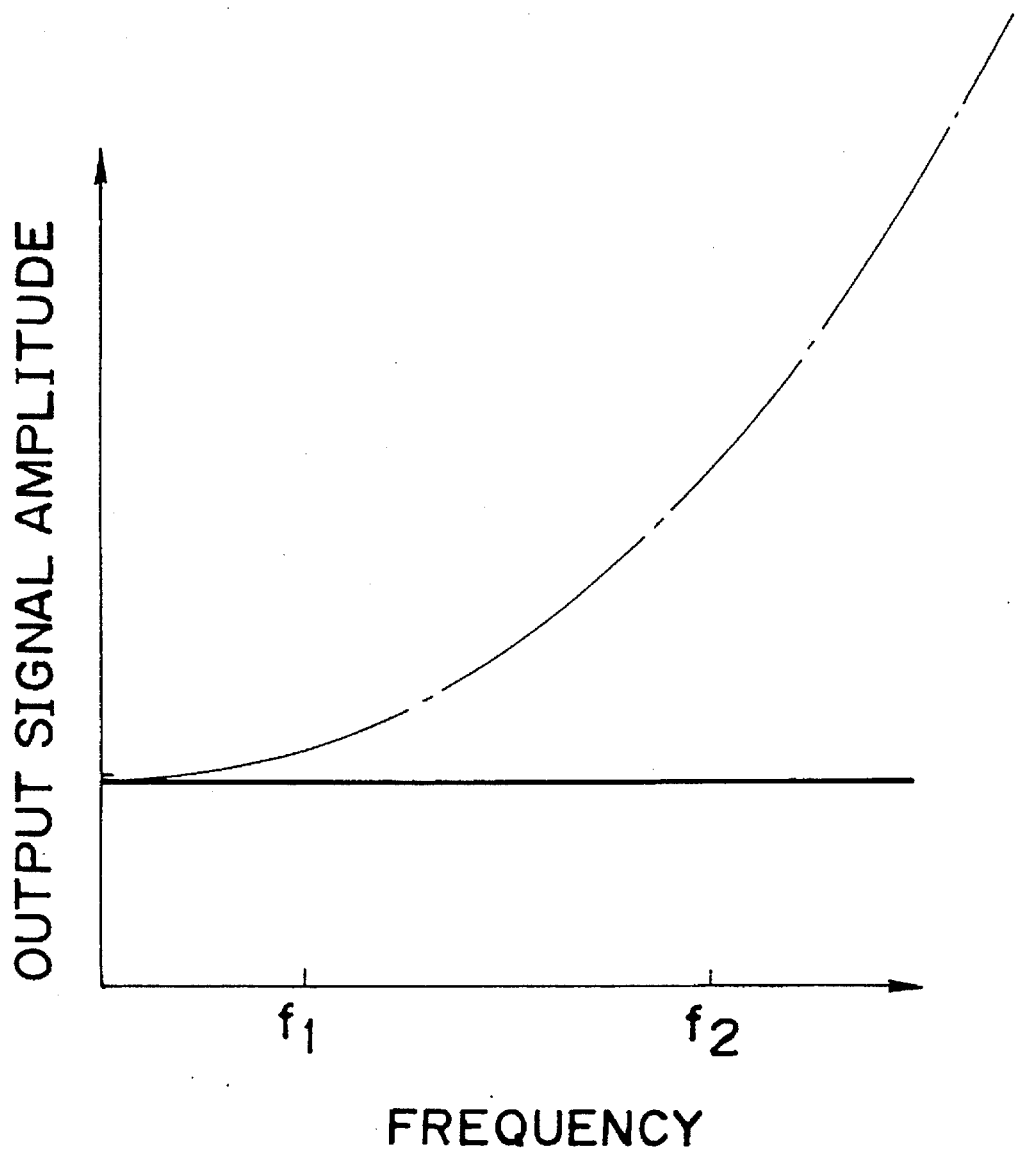
FIG. 11 is a graph showing an operational characteristic between the input frequency and the output signal amplitude of the circuit of FIG. 10(a)

FIG. 11 shows an operational characteristic view between the input frequency and the output signal amplitude, where the amplitude increases in proportion to the square of the frequency as shown by a one-dotted broken line while a solid line represents an amplitude-regulated characteristic obtained through the feedback control loop which is described below in connection with FIG. 8.

Figure 8:
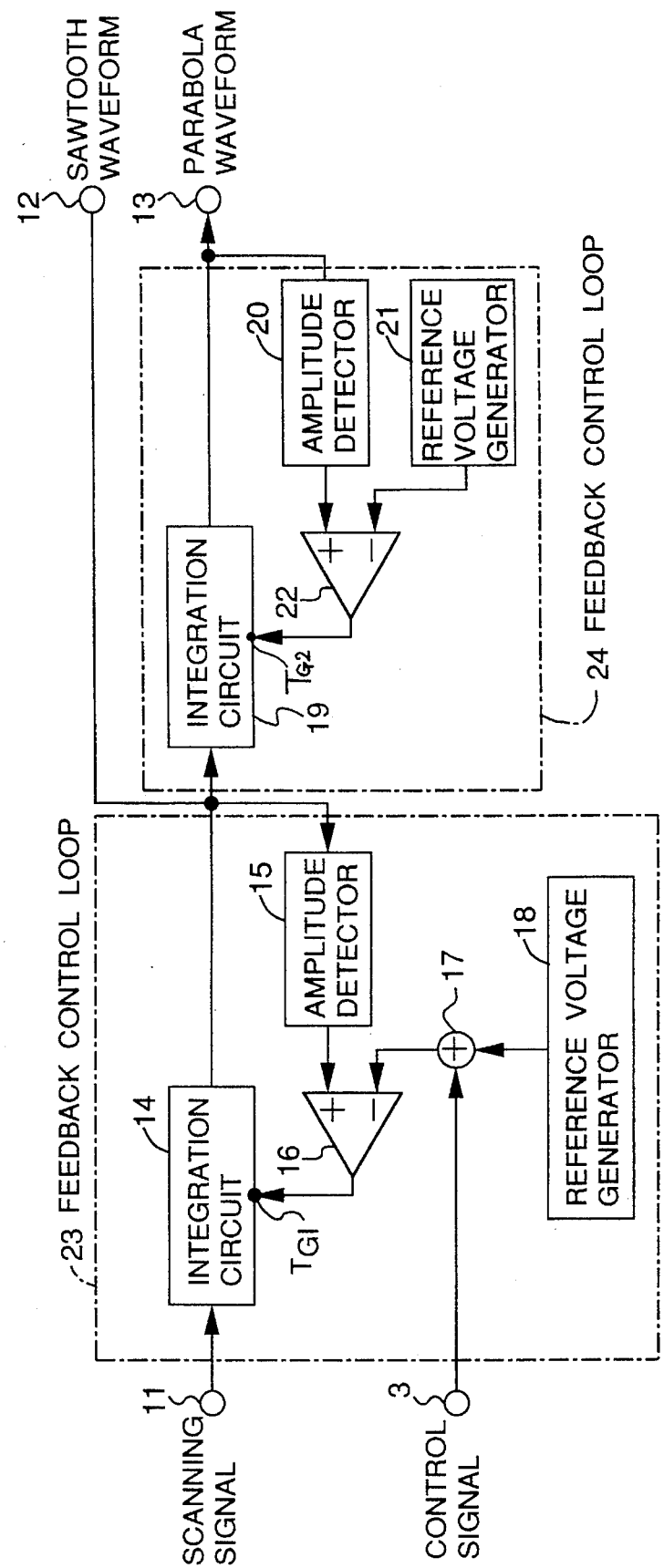
FIG. 8 is a block diagram of the fundamental correction waveform generation section of the first embodiment.

Referring to FIG. 8, a fundamental correction waveform generating portion in the section 5 is composed of a plurality of feedback control loops 23 and 24 for automatic gain control and further feedback control loop (not shown) for higher-order correction arranged in parallel thereto. The first feedback control loop 23 for automatic gain control includes an integration circuit 14, amplitude detector circuit 15, comparator 16 and reference voltage generator circuit 18. The second feedback control loop 24 similarly includes an integration circuit 19, amplitude detector circuit 20, comparator 22 and reference voltage generator circuit 21.

In the first feedback control loop 23 for automatic gain control of a sawtooth waveform, an input terminal 11 receives scanning signals having different scanning frequencies as shown in FIGS. 9(a) and 9(b), which the scanning waveforms correspond to the scanning output from the scanning waveform generating section 6. The input scanning signal supplied from the input terminal 11 is fed to the integration circuit 14 to generate a corresponding one of the sawtooth waveforms as shown in FIGS. 9(c) and 9(d). The resulting sawtooth waveform output from the integration circuit 14 is fed back to the comparator 16 by way of the amplitude detector circuit 15.

The amplitude of the sawtooth waveform output from the integration circuit 14 is detected by the amplitude detector circuit 15, and the resultant detection signal is compared by means of the comparator 16 with a reference voltage supplied from the reference voltage generator circuit 18 while the reference voltage is being added with the control signal by way of an adder 17. The adder 17 adds the control signal fed through the terminal 3 to the reference voltage. The resultant comparison signal output from the comparator 16 is fed back to a gain control terminal $T_{G1}$ of the integration circuit 14 thereby to output a sawtooth waveform having a regular amplitude through an output terminal 12 even when the scanning frequency is changed as shown in FIGS. 9(c) and 9(d). The sawtooth waveform output from the integration circuit 14 may have a different scanning frequency and a regular amplitude as shown in FIGS. 9(c) and 9(d).

The sawtooth waveform output from the integration circuit 14 having different scanning frequency and a regular amplitude is supplied to the integration circuit 19 in the second feedback control loop 24 to generate parabola waveforms as shown in FIGS. 9(e) and 9(f) through another output terminal 13.

In the second feedback control loop 24 for automatic gain control of a parabola waveform, the parabola waveform output from the integration circuit 19 is fed back to the amplitude detector circuit 20. The amplitude detector circuit 20 detects the amplitude of the parabola waveform, and the resultant detection signal is compared in the comparator 22 with a reference voltage supplied from the reference voltage generator circuit 21. The resultant comparison signal output from the comparator 22 is fed back to a gain control terminal $T_{G2}$ of the integration circuit 19 to output a parabola waveform having a regular amplitude as shown in FIGS. 9(e) and 9(f) through the output terminal 13 even when the scanning frequency is changed.

As a reference voltage applied to the comparator 16 in the first feedback control loop 23, the comparator 16 is supplied with a signal formed by adding the reference voltage generated by the reference voltage generator circuit 18 to the control signal for controlling the amplitude fed from the input terminal 3 in the adder 17. This means that the control signal fed through the input terminal 3 to the loop 23 changes the amplitudes of the convergence correction waveforms (sawtooth waveform and parabola waveform).

Figure 12:
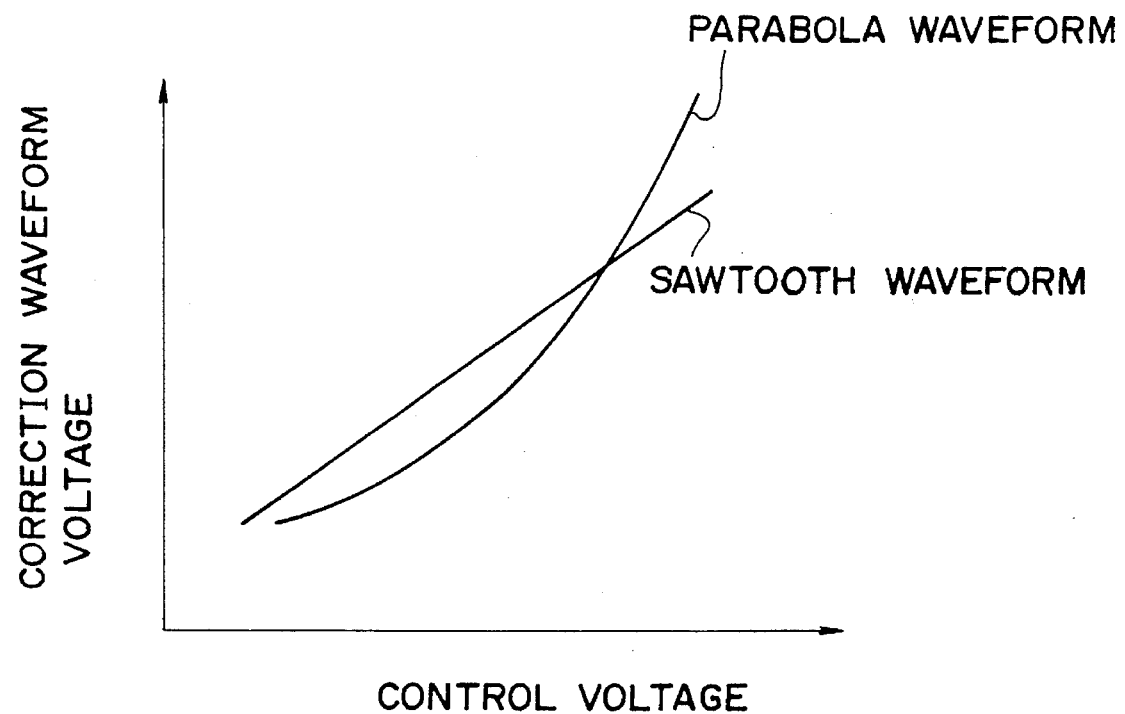
FIG. 12 is a graph showing a relation between a control voltage and each correction waveform voltage.

FIG. 12 shows a relation between the control signal and each correction waveform voltage, where the amplitude of the correction waveform is controlled so that the amplitude of the sawtooth waveform is proportional to that of the control signal while the amplitude of the parabola waveform is proportional to the square of that of the control signal.

By the first and second feedback control loop 23 and 24, the sawtooth and parabola waveforms each having a regular amplitude can be generated as the convergence correction waveforms even when the scanning frequency is changed, where in the first feedback control loop 23 the reference voltage is controlled by the control signal to form the sawtooth waveforms each having a regular amplitude proportional to that of the control signal. The resultant sawtooth waveforms are input to the second feedback control loop 24 to be further processed in the integration circuit 19, thereby automatically obtaining the parabola waveforms each having a regular amplitude proportional to the square of that of the control signal.

In the same manner as the formation of the fundamental correction waveform in the horizontal scanning period as described above, a correction waveform in the vertical scanning period can be formed. Therefore, as described with regard to the correspondence in aspect ratio in conjunction with FIGS. 4 through 7, a convergence correction waveform corresponding to each aspect ratio is automatically formed only by changing the control signal.

FIGS. 13(1) through 13(4) show variations in correction represented by the movement of display on the screen according to various convergence correction waveforms.

Referring to FIGS. 13(1-A) to 13(1-C), when a correction waveform of a vertical sawtooth waveform shown in FIG.

13(1-A) is supplied to a vertical convergence coil, vertical amplitude correction is performed as shown in FIG. 13(1-B), and on the other hand, when the correction waveform of the vertical sawtooth waveform is supplied to a horizontal convergence coil, orthogonal correction of vertical lines is performed as shown in FIG. 13(1-C).

Referring to FIGS. 13(2-A) to 13(2-C), when a correction waveform of a vertical parabola waveform shown in FIG. 13(2-A) is supplied to a vertical convergence coil, vertical linearity correction is performed as shown in FIG. 13(2-B), and on the other hand, when the correction waveform of the vertical parabola waveform is supplied to a horizontal convergence coil, vertical line curve correction is performed as shown in FIG. 13(2-C).

Referring to FIGS. 13(3-A) to 13(3-C), when a correction waveform of a horizontal sawtooth waveform shown in FIG. 13(3-A) is supplied to a vertical convergence coil, orthogonal correction of horizontal lines is performed as shown in FIG. 13(3-B), and on the other hand, when the correction waveform of the horizontal sawtooth waveform is supplied to a horizontal convergence coil, horizontal amplitude correction is performed as shown in FIG. 13(3-C).

Referring to FIGS. 13(4-A) to 13(4-C), when a correction waveform of a horizontal parabola waveform shown in FIG. 13(4-A) is supplied to a vertical convergence coil, horizontal line curve correction is performed as shown in FIG. 13(4-B), and on the other hand, when the correction waveform of the horizontal parabola waveform is supplied to a horizontal convergence coil, horizontal linearity correction is performed as shown in FIG. 13(4-C).

As shown in FIGS. 13(1) through 13(4), the automatic convergence correction can be effected even when the scanning frequency and/or the aspect ratio is changed.

Then the following describes in detail a method for forming a divisional correction waveform with reference to FIG. 14 and FIGS. 15(a) through 15(n).

FIG. 14 shows a divisional correction waveform generating portion of the section 5, which includes a horizontal (H) sawtooth waveform generator circuit 29, a horizontal (H) parabola waveform generator circuit 30, a horizontal (H) sine waveform generator circuit 31, a vertical (V) sawtooth waveform generator circuit 34, a vertical (V) parabola waveform generator circuit 35, and a vertical (V) sine waveform generator circuit 37, where each of the circuits is a correction waveform generator circuit composed of an integration circuit in the feedback control loop as shown in FIG. 8. The horizontal (H) sawtooth waveform generator circuit 29, horizontal (H) parabola waveform generator circuit 30, and horizontal (H) sine waveform generator circuit 31 are serially connected. Also, the vertical (V) sawtooth waveform generator circuit 34, vertical (V) parabola waveform generator circuit 35, and vertical (V) sine waveform generator circuit 37 are serially connected. The horizontal (H) sawtooth waveform generator circuit 29 and vertical (V) sawtooth waveform generator circuit 34 correspond to the first feedback control loop 23 for automatic sawtooth waveform gain control shown in FIG. 8. The horizontal (H) parabola waveform generator circuit 30 and vertical (V) parabola waveform generator circuit 35 correspond to the second feedback control loop 24 for automatic parabola waveform gain control shown in FIG. 8. The horizontal (H) sine waveform generator circuit 31 and vertical (V) sine waveform generator circuit 37 correspond to further feedback control loop for higher-order correction for automatic sine waveform gain control (not shown in FIG. 8). Regarding the relation between the amplitude of the respective waveforms and that of the control signal, the amplitude of the sawtooth waveform is proportional to that of the control signal, the amplitude of the parabola waveform is proportional to the square of that of the control signal, and the amplitude of the sine waveform is proportional to the cube of that of the control signal.

A horizontal scanning signal as shown in FIG. 15(a) input through the input terminal 25 is supplied to the H sawtooth waveform generator circuit 29 to form a horizontal sawtooth waveform as shown in FIG. 15(b) by receiving a horizontal amplitude control signal from a terminal 26. The sawtooth waveform generated by the H sawtooth waveform generator circuit 29 is supplied to the H parabola waveform generator circuit 30 to form a horizontal parabola waveform as shown in FIG. 15(c). The parabola waveform generated by the H parabola waveform generator circuit 30 is supplied to the H sine waveform generator circuit 31 to form a sine waveform as shown in FIG. 15(d).

On the other hand, the sawtooth waveform generated by the H sawtooth waveform generator circuit 29 is also supplied to a comparator 32 to be compared with a reference voltage of 0 V for detecting the scanning center position of the sawtooth waveform to output a horizontal changeover signal as shown in FIG. 15(e). The horizontal changeover signal is supplied from the comparator 32 to a changeover circuit (SW) 33 to form horizontal (H) sine divisional correction waveforms 1 as shown in FIGS. 15(f) and 15(g) at an output terminal 40.

In the same manner, a vertical scanning signal as shown in FIG. 15(h) input through the input terminal 27 is supplied to the V sawtooth waveform generator circuit 34 to form a vertical sawtooth waveform as shown in FIG. 15(i) by receiving a vertical amplitude control signal from a terminal 28. The sawtooth waveform is supplied from the V sawtooth waveform generator circuit 34 to the V parabola waveform generator circuit 35 to form a vertical parabola waveform as shown in FIG. 15(j). The parabola waveform generated by the V parabola waveform generator circuit 35 is supplied to the V sine waveform generator circuit 37 to form a sine waveform as shown in FIG. 15(k). On the other hand, the sawtooth waveform generated by the V sawtooth waveform generator circuit 34 is also supplied to a comparator 36 to be compared with a reference voltage of 0 V for detecting the scanning center position of the sawtooth waveform to output a vertical changeover signal as shown in FIG. 15(l). The vertical changeover signal output from the comparator 36 is supplied to a changeover circuit (SW) 39 to form vertical (V) sine divisional correction waveforms 3 as shown in FIGS. 15(m) and 15(n).

On the other hand, an H sawtooth waveform from the H sawtooth waveform generator circuit 29, a V sawtooth waveform from the V sawtooth waveform generator circuit 34, and H and V changeover signals output from the comparators 32 and 36 respectively are supplied to further another changeover circuit (SW) 38 to form divisional correction waveforms 2 as shown in FIGS. 16(c), 16(d), 16(e), and 16(f) at an output terminal 41 each having a horizontal scanning period shown in FIG. 16(a) and a vertical scanning period shown in FIG. 16(b).

Figure 17:
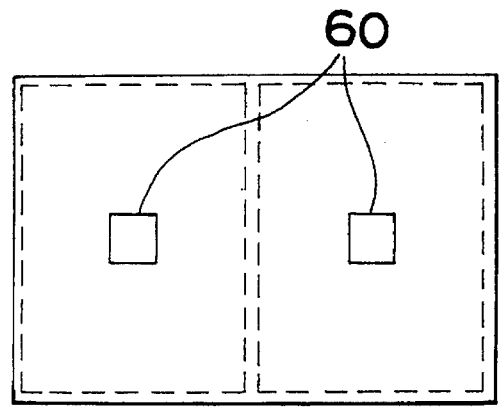
FIG. 17 is a view of a display screen for explaining the operation of the divisional correction waveform generation section of the first embodiment.
Figure 18:
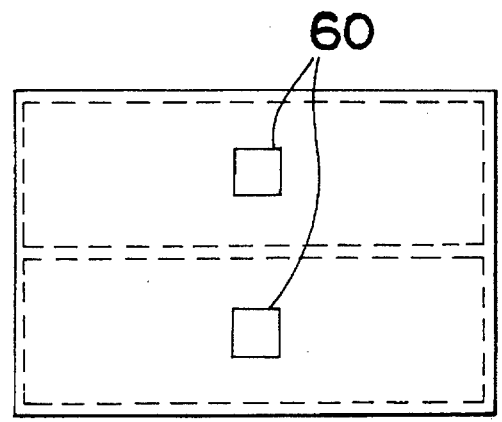
FIG. 18 is a view of another display screen for explaining the operation of the divisional correction waveform generation section of the first embodiment.
Figure 19:
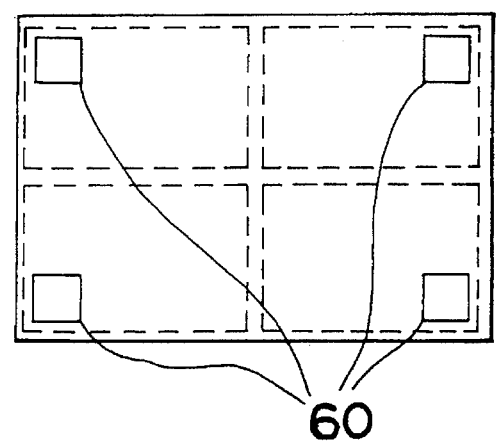
FIG. 19 is a view of yet another display screen for explaining the operation of the divisional correction waveform generation section of the first embodiment.

FIGS. 17 through 19 show division areas where the convergence is varied on the screen by the divisional correction waveforms. The divisional correction waveforms 1 shown in FIGS. 15(f) and 15(g) can correct the convergence in areas divided right and left horizontally on the screen as shown in FIG. 17. The divisional correction waveforms 3 shown in FIGS. 15(m) and 15(n) can correct the convergence in areas divided upper and lower vertically on the screen as shown in FIG. 18. The divisional correction waveforms 2 shown in FIGS. 16(c) to 16(f) can correct the convergence at the four corners of the screen as shown in FIG. 19, where the left upper corner corresponds to the divisional correction waveform shown in FIG. 16(c), the right upper corner corresponds to the divisional correction waveform shown in FIG. 16(d), the right lower corner corresponds to the divisional correction waveform shown in FIG. 16(e), and the left lower corner corresponds to the divisional correction waveform shown in FIG. 16(f). In FIGS. 17 through 19, each mark □ 60 indicates a portion where the maximum change of convergence is effected. As described above, a high-accuracy convergence correction can be achieved by forming not only the fundamental correction waveforms but also the divisional correction waveforms as convergence correction waveforms.

Figure 20:
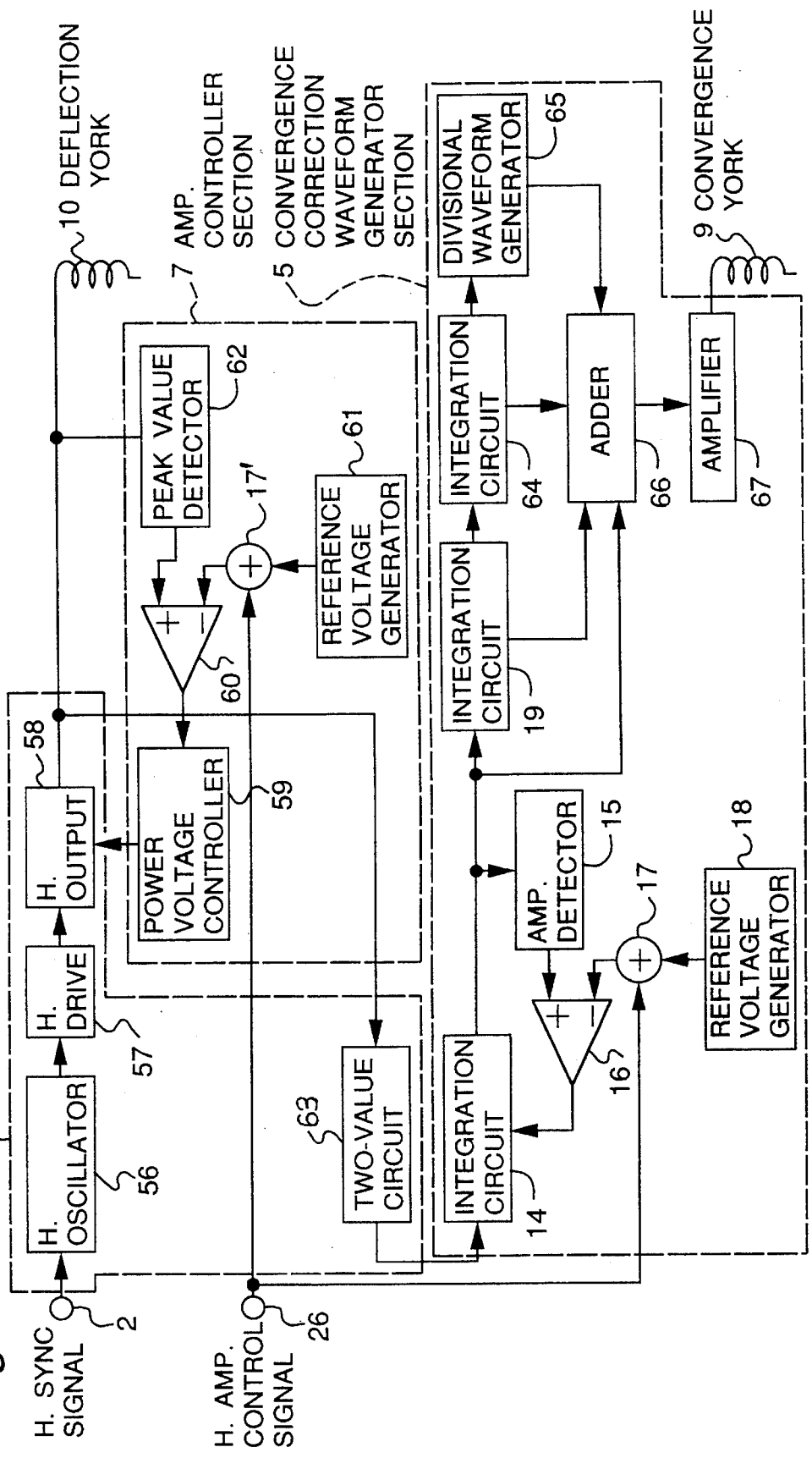
FIGS. 20 and 21 are block diagrams showing constructions of a horizontal and vertical correction systems respectively.
Figure 21:
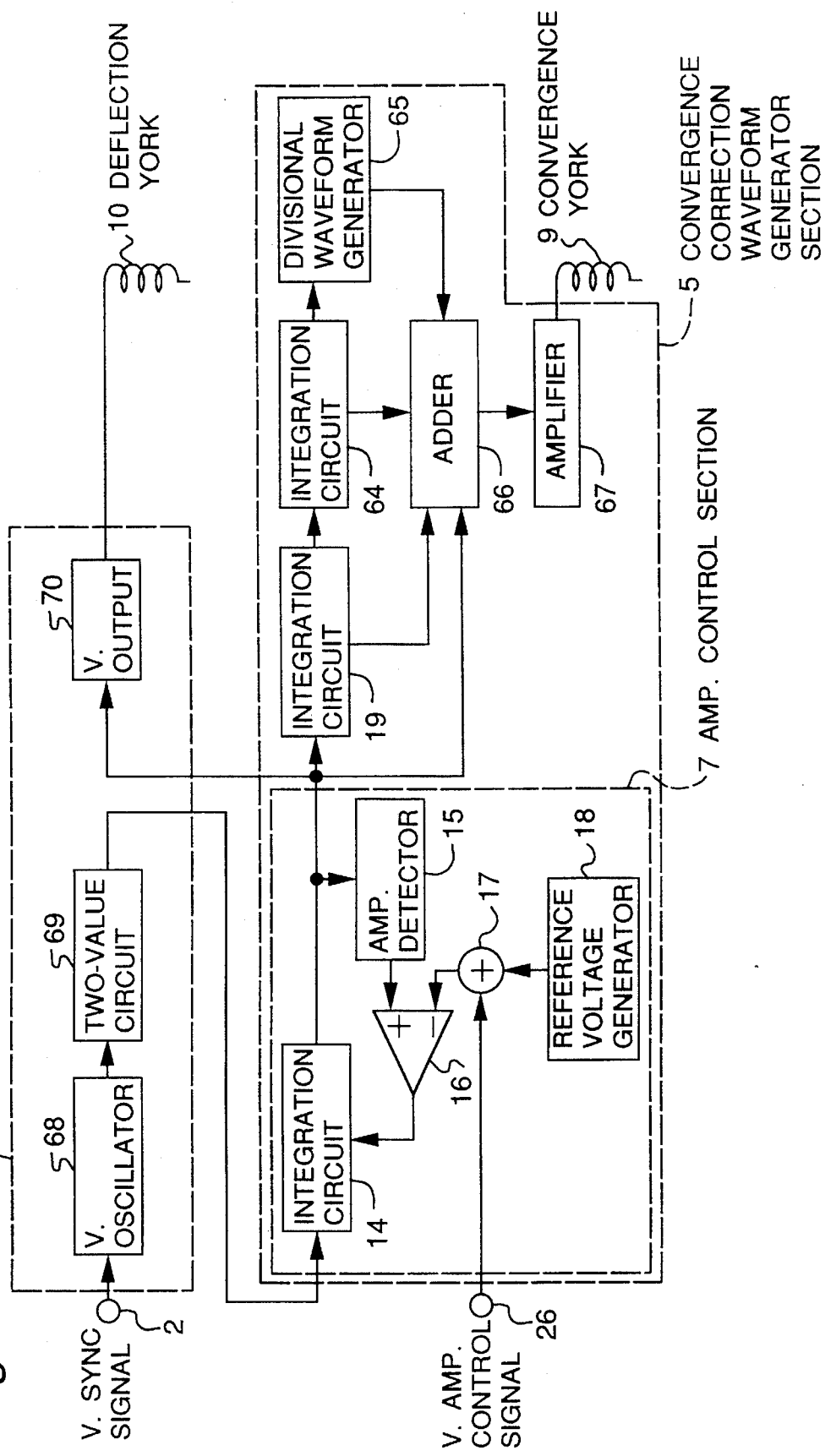

The following describes an entire system including a scanning waveform generating section 6, amplitude control section 7 and convergence correction waveform generating section 5 with reference to FIGS. 20 and 21.

FIGS. 20 and 21 show constructions of a horizontal and vertical correction systems respectively. It is noted here that like parts in FIGS. 20 and 21 similar to those in FIG. 8 are designated by the same reference numerals.

Referring to FIG. 20, a horizontal sync signal is applied to a horizontal oscillator circuit 56 through a sync input terminal 2, which the oscillator circuit 56 performs a pulse oscillation in synchronization with the sync signal. The output of the oscillator circuit 56 is applied to a horizontal drive circuit 57 which performs a drive operation for driving the horizontal output signal. The output of the drive circuit 57 is applied to a horizontal output circuit 58 which drives a deflection york 10 to effect a horizontal scanning with horizontal defelection current of a sawtooth waveform flowing therethrough, where the circuits 56, 57 and 58 are included in the section 6.

A flyback pulse is induced by the deflection yolk 10 and the peak value of the pulse is detected by a peak value detector 62 and the resultant detection value is supplied to a comparator 60. The comparator 60 compares the detection peak value with a reference voltage supplied from a reference voltage generating circuit 61 by way of an adder 17'. The comparison result output from the comparator 60 is applied to a power voltage control circuit 59, where the circuits 59 through 62 are included in the section 7. The power voltage control circuit 59 controls the source voltage to be supplied to the horizontal output circuit 58 in such a manner that the flyback pulse has a constant peak value.

Therefore, even when the horizontal scanning frequency is varied, a constant deflection current flows through the deflection york 10 to maintain the horizontal amplitude to be constant. The flyback pulse induced in the deflection york 10 is supplied to a two-value circuit 63 in the section 6 to form a horizontal scanning signal for forming a fundamental correction waveform for convergence correction. The horizontal scanning signal output from the two-value circuit 63 is supplied to a feedback control loop comprised of an integration circuit 14, amplitude detector circuit 15, comparator 16, adder 17 and reference voltage generating circuit 18 provided in the section 5 as described in connection with FIG. 8, thereby forming a horizontal sawtooth waveform. Further, an integration circuit 19 generates a horizontal parabola waveform, the subsequent integration circuit 64 generates a horizontal sine waveform, and a division waveform generating circuit 65 generates a division correction waveform. The correction waveforms output from the integration circuits 14, 19 and 64 and the division waveform generating circuit 65 are supplied to an adder 66 to be added together. Thereafter, the output of the adder 66 is amplified by means of an amplifier 67 to drive the convergence yolk 9 through which a horizontal convergence correction current flows to perform the horizontal convergence correction. The horizontal amplitude control signal applied through the input terminal 26 is supplied to the scanning waveform generating section 6 and to the adder 17' located in the amplitude control section 7. The horizontal amplitude control signal is also applied to the adder 17 in the feedback control loop in the convergence correction waveform generating section 5, thereby controlling the raster size and forming a convergence correction corresponding to the raster size.

Similarly, referring to the vertical correction system shown in FIG. 21, a vertical sync signal is applied to a vertical oscillator circuit 68 through the input terminal 2 to perform a pulse oscillation in synchronization with the sync signal. The output from the oscillator circuit 68 is applied to a two-value circuit 69 to form a binary data to form a vertical scanning signal for forming a fundamental correction waveform for convergence correction. The vertical scanning signal output from the two-value circuit 69 is supplied to a feedback control loop comprised of an integration circuit 14, amplitude detector circuit 15, comparator 16, adder 17 and reference voltage generating circuit 18 provided in the section 5 as described in connection with FIG. 8, thereby forming a vertical sawtooth waveform. Further, an integration circuit 19 generates a vertical parabola waveform, the subsequent integration circuit 64 generates a vertical sine waveform, and a division waveform generating circuit 65 generates a division correction waveform. The correction waveforms output from the integration circuits 14, 19 and 64 and the division waveform generating circuit 65 are supplied to an adder 66 to be added together. Thereafter, the output of the adder 66 is amplified by means of an amplifier 67 to drive the convergence york 9 through which a vertical convergence correction current flows to perform the vertical convergence correction.

The vertical amplitude control signal applied through the input terminal 28 is supplied to the adder 17 in the feedback control loop in the convergence correction waveform generating section 5, thereby controlling the raster size and forming a convergence correction corresponding to the raster size. On the other hand, the vertical sawtooth waveform output from the integration circuit 14 is supplied to a vertical output circuit 70 to drive the deflection york 10 through which vertical deflection current of a sawtooth waveform flows to perform the vertical scanning operation.

In the vertical scanning operation, the scanning signal of a vertical sawtooth waveform is used in common both the scanning waveform generating section 6 and the convergence correction waveform generating section 5. Therefore, a stable amplitude control is performed, flowing a constant deflection current through the deflection york 10 to maintain the vertical amplitude to be constant. In FIG. 21, although the vertical output circuit 70 receives the vertical sawtooth waveform signal output from the feedback control loop composed of the integration circuit 14 and the like in the section 5 as its input signal, there may be provided a similar feedback control loop between the vertical oscillator circuit 68 and the vertical output circuit 70 to generate a vertical scanning waveform.

According to the present embodiment as described above, a convergence correction waveform is formed in accordance with the scanning waveform corresponding to the scanning frequency and the raster size, so that a convergence correction can be effected automatically following the signal sources having different scanning frequencies and different aspect ratios, which remarkably reduces the time for adjustment.

Embodiment 2

Figure 22:
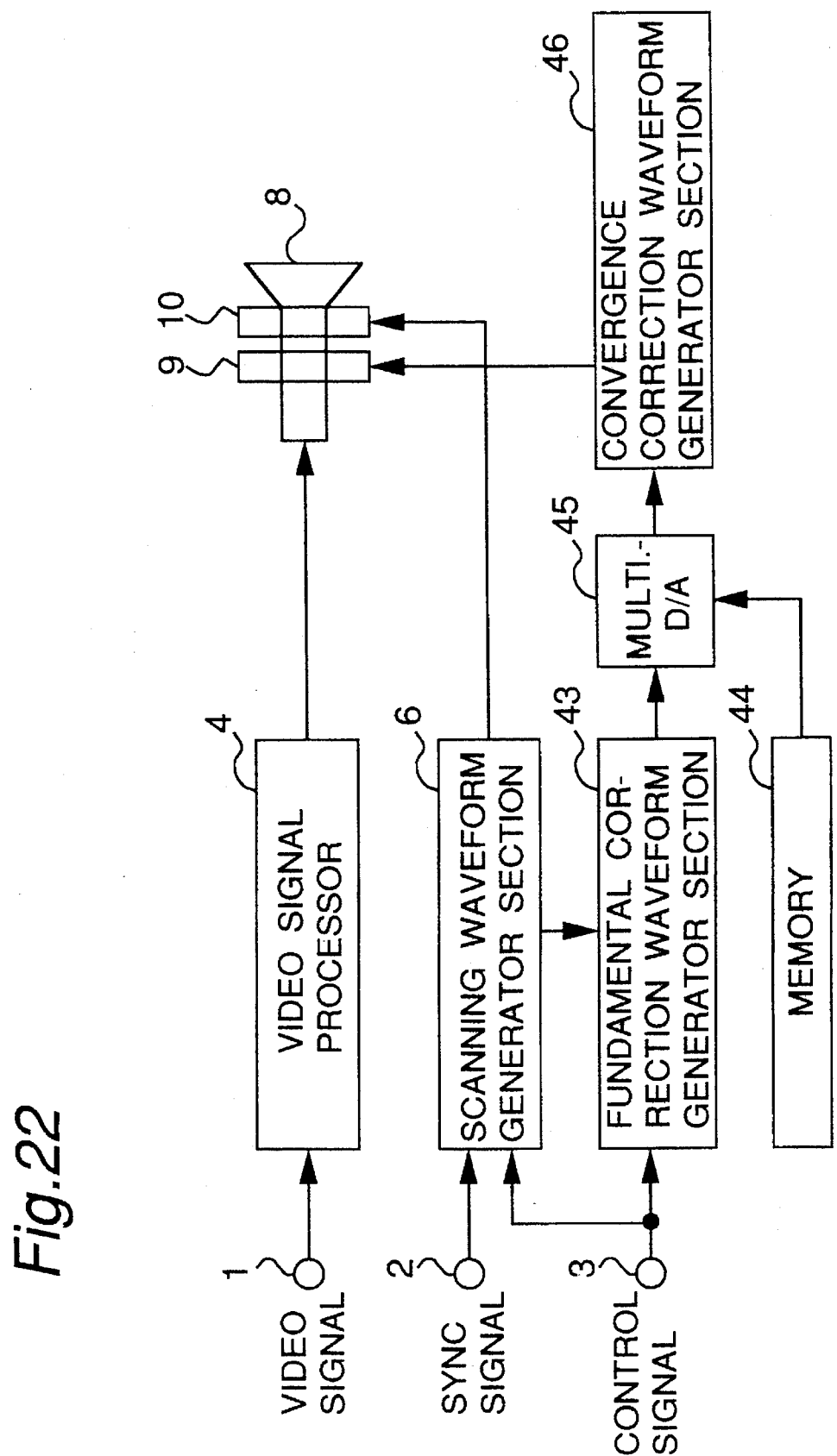
FIG. 22 is a block diagram of an image correction apparatus including a convergence correction apparatus in accordance with a second embodiment of the present invention.
Figure 23:
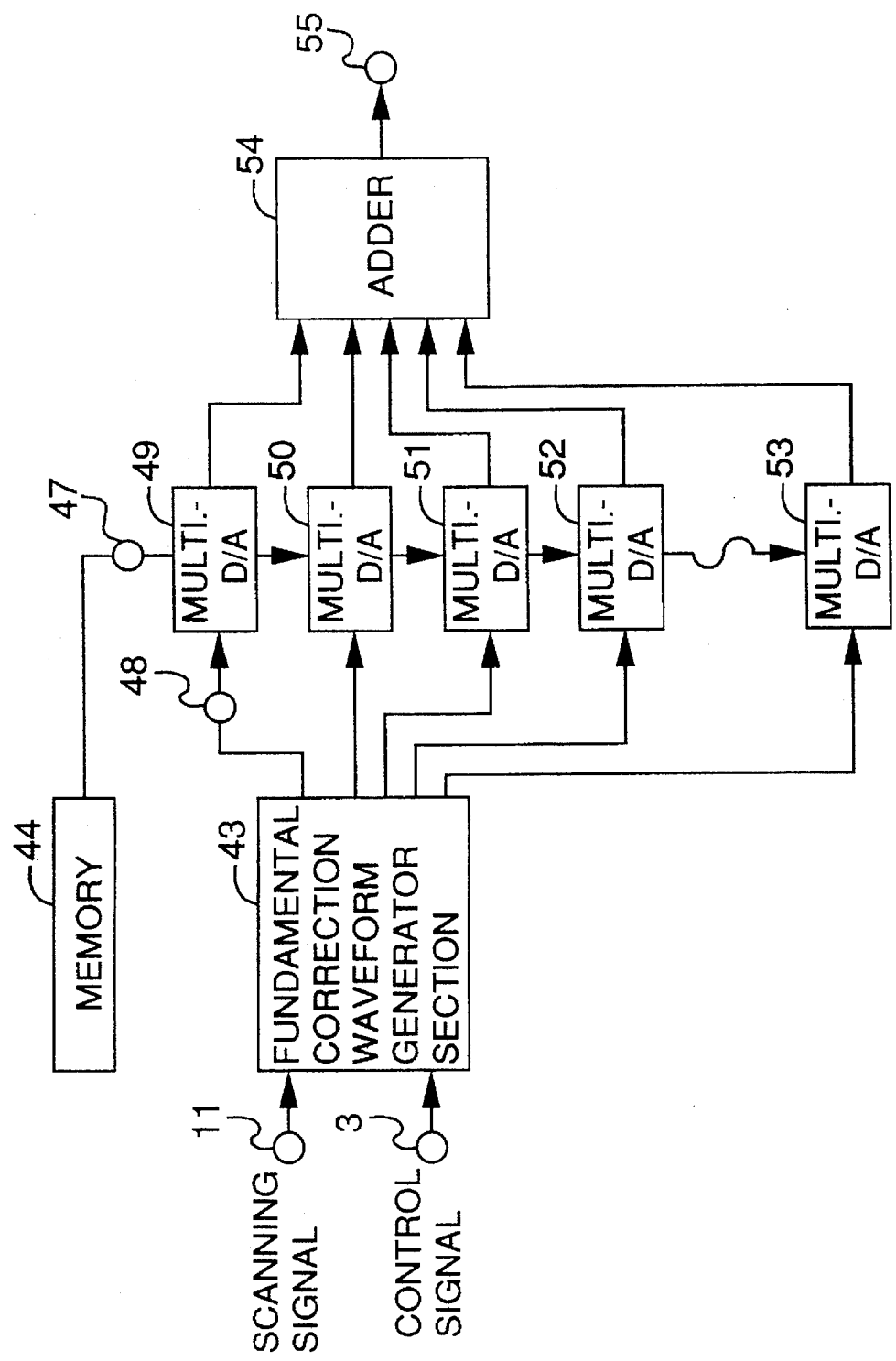
FIG. 23 is a block diagram of a data control system of the second embodiment.
Figure 24:
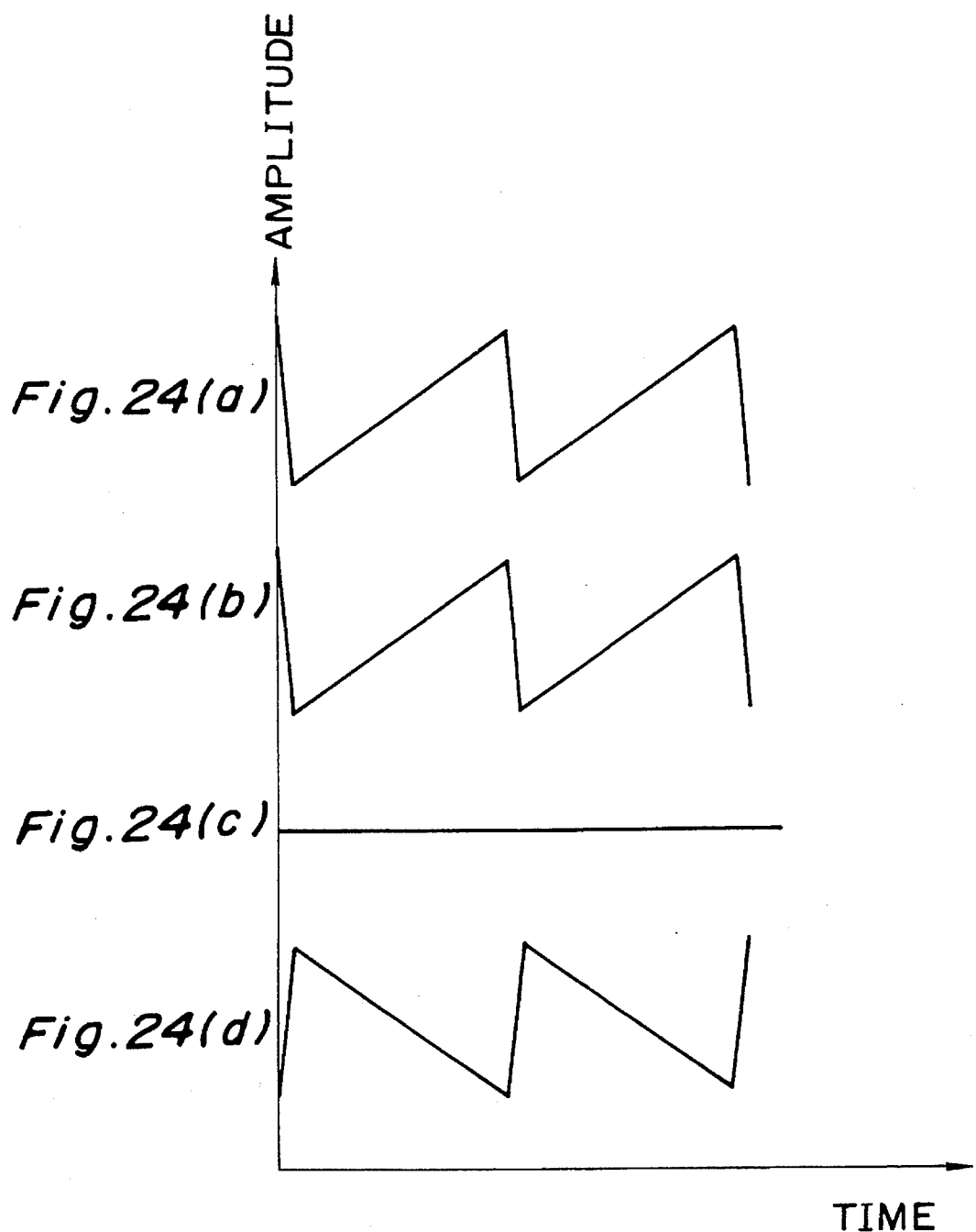
FIGS. 24(a), 24(b), 24(c) and 24(d) are charts of waveforms for explaining the operation of the data control system of the second embodiment.

Then the following describes a second embodiment of the present invention with reference to FIGS. 22 through 24. The same parts having the same function as in the first embodiment are denoted by the same numerals, and herein no description is provided therefor.

FIG. 22 shows an image correction apparatus which includes a convergence correction apparatus in accordance with a second embodiment of the present invention.

Referring to FIG. 22, the convergence correction apparatus includes a fundamental correction waveform generation section 43 for forming a fundamental correction waveform for convergence correction according to the sync signal input through the input terminal 2 and the control signal input through the input terminal 3 for controlling the raster size. The convergence correction apparatus further includes a memory 44 for storing correction data for controlling the amplitude of each fundamental correction waveform. The apparatus also includes a multiplication type digital-to-analog converter 45 (referred to as "multiplication type D-A converter" hereinafter) having a digital-to-analog conversion function for converting digital correction data supplied from the memory 44 into an analog quantity and a multiplication function for multiplying the resulting conversion signal by each correction waveform fed from the fundamental correction waveform generation section 43 to control the amplitude and direct current electric potential of the fundamental correction waveform. Reference numeral 46 denotes a convergence correction waveform generation section for generating a convergence correction waveform according to each amplitude-controlled fundamental correction waveform output from the multiplication type D-A converter 45. The convergence correction waveform output from the section 46 is supplied to the convergence york 9 to be driven.

The following describes the convergence correction apparatus of the second embodiment having the above-mentioned construction.

The scanning waveform generating section 6 receives the sync signal and the control signal through the terminals 2 and 3 respectively to generates the scanning waveform signal corresponding to the scanning frequency which is fed to the fundamental correction waveform generation section 43 which generates an analog correction waveform of parabola and sawtooth waveform in each scanning direction. The analog correction waveform output from the section 43 is applied to the reference voltage input terminal of the multiplication type D-A converter 45. In addition, the control signal applied through the input terminal 3 is supplied to the fundamental correction waveform generating section 46 to control the reference voltage in the feedback control loop for forming the sawtooth waveform as described in connection with FIG. 14, thereby forming a fundamental correction waveform corresponding to the aspect ration.

On the other hand, the correction data for each fundamental correction waveform is stored in the memory 44 and the digital correction data output from the memory 44 is supplied to a data input terminal of the multiplication type D-A converter 45. The multiplication type D-A converter 45 multiplies the digital-to-analog conversion signal by the analog fundamental correction waveform to control the amplitude of the correction waveform and direct current electric potential. The correction data output from the multiplication type D-A converter 45 is supplied to the convergence correction waveform generation section 46 to form a correction waveform for driving the convergence yoke 9.

Then the following describes in detail the operation of the multiplication type D-A converter 45 and the convergence correction waveform generation section 46 with reference to the block diagram as shown in FIG. 23 and correction waveforms as shown in FIGS. 24(a) through 24(d).

In FIG. 23, the scanning signal output from the scanning waveform generating section 6 and the control signal are both supplied to the fundamental correction waveform generating section 43 by way of the input terminals 11 and 3 respectively to form a fundamental correction waveform corresponding to the scanning frequency and the raster size. The serial correction data output from the memory 44 is input to the D/A converter 49 by way of an input terminal 47 shown in FIG. 23. Meanwhile, a horizontal sawtooth waveform as shown in FIG. 24 (a) is supplied from the fundamental correction waveform generation section 43 to the D/A converter 49 by way of a reference voltage terminal 48. In a multiplication type D-A converter 49, an analog data obtained through a digital-to-analog conversion of the serial digital data input through the input terminal 47 is multiplied by an analog correction waveform input through the reference voltage terminal 48. The relation between the memory data of 16 scale system of notation (i.e., total 256 steps of data) output from the memory 44 and the correction waveform output from the section 43 is shown in Table 1.

TABLE 1

| Memory Data | Correction waveform |
|---|---|
| 00H | Positive Polarity {(FIG. 24 (b)} |
| ... | ... |
| 80H | Non-polarity {FIG. 24 (c)} |
| ... | ... |
| FFH | Negative polarity {(FIG. 24 (d)} |

From an output terminal of the multiplication type D-A converter 49, generated is an output correction waveform with a positive polarity as shown in FIG. 24 (b) when the data of 16-scale notation from the memory 44 is the minimum value of 00H (i.e., 000), or generated is an uncorrected flat correction waveform without signal representation as shown in FIG. 24 (c) when the data from the memory 44 is the middle value of 80H (i.e., 128), or generated is an output correction waveform with a negative polarity as shown in FIG. 24 (d) when the data from the memory 44 is the maximum value of FFH (i.e., 256). The above fact means that the amplitude and the polarity of the correction waveform is controlled in accordance with the data from the memory 44. Therefore, it is possible to form an optimum correction waveform for each portion to be corrected. The correction waveforms and data output from the multiplication type D-A converters 49 through 53 are supplied to an adder 54 which forms a convergence correction waveform for effecting convergence correction by adding fundamental correction waveforms necessary for various correction systems.

As described above, by effecting an amplitude control of the fundamental correction waveform so that the sawtooth waveform component is proportional to the change in amplitude of the control signal and the parabola waveform component is proportional to the square of the same, a convergence correction waveform is formed from the scanning waveform corresponding to the scanning frequency and the raster size. With the above-mentioned arrangement, a convergence correction can be effected by automatically following signal sources having different scanning frequencies and different aspect ratios.

Therefore, in contrast to the conventional case where the memory 44 requires a memory capacity corresponding in amount to a signal source which may have a different scanning frequency and a different aspect ratio, the apparatus of the present embodiment can automatically form an optimum convergence correction waveform even for the signal sources having different scanning frequencies and different aspect ratios by merely writing one type of fundamental correction data into the memory 44.

Figure 25:
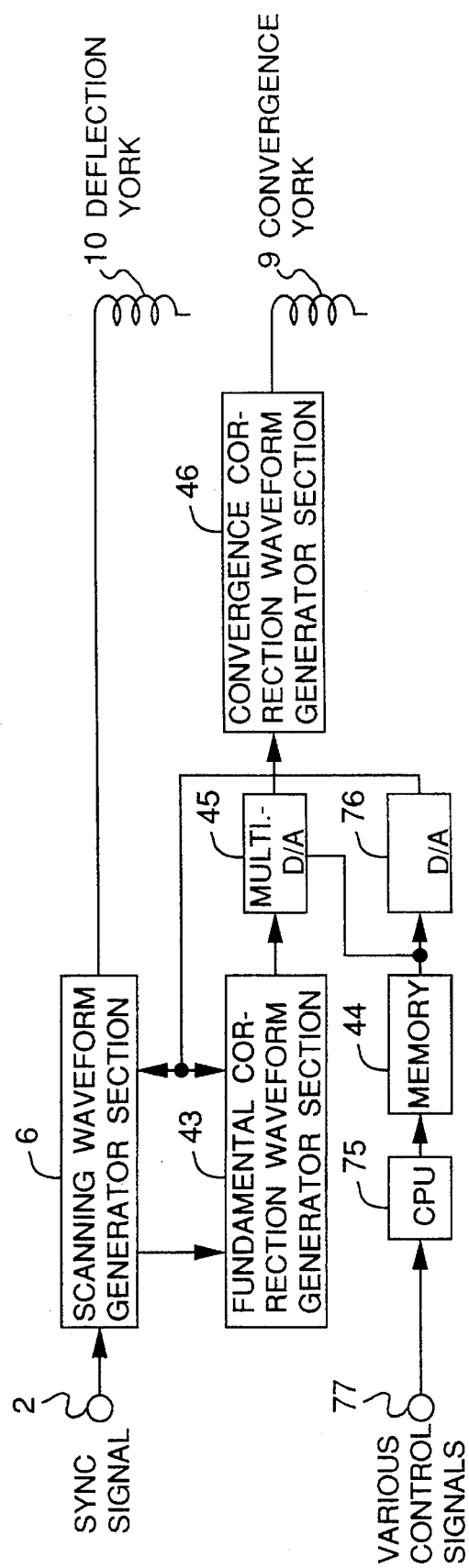
FIG. 25 is a block diagram for explaining the scanning waveform generation and convergence correction waveform generation.
Figure 26:
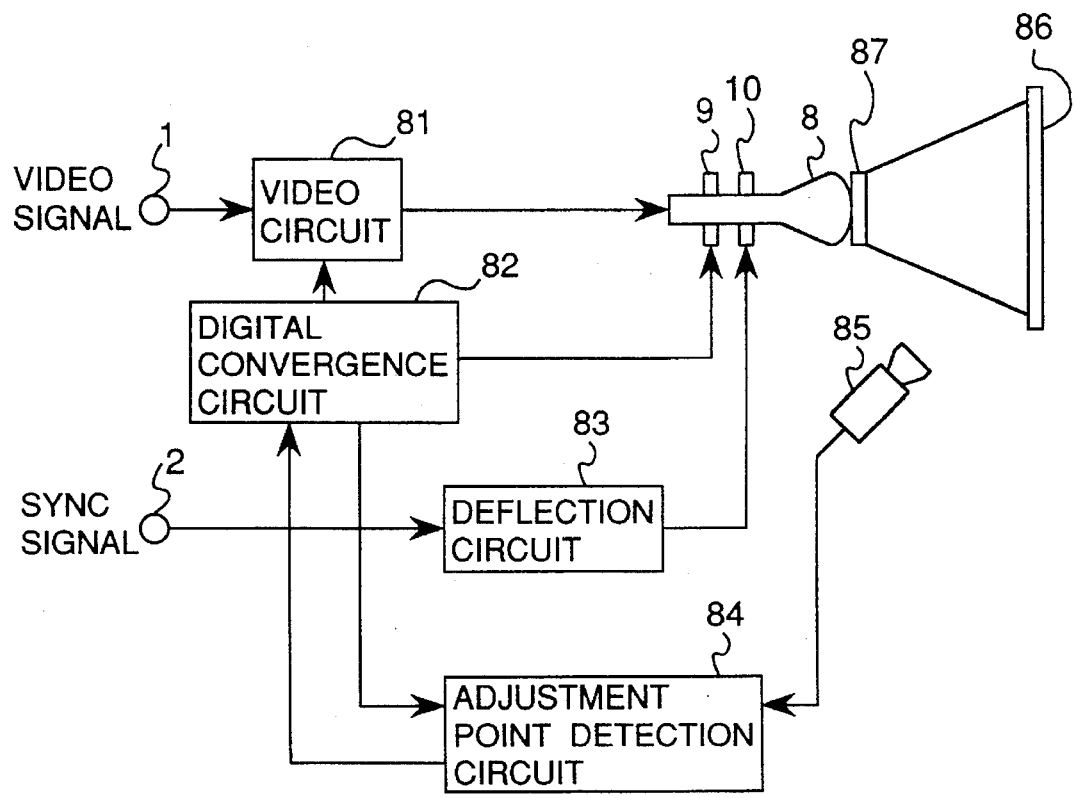
FIG. 26 is a block diagram of a conventional convergence correction apparatus.
Figure 27:
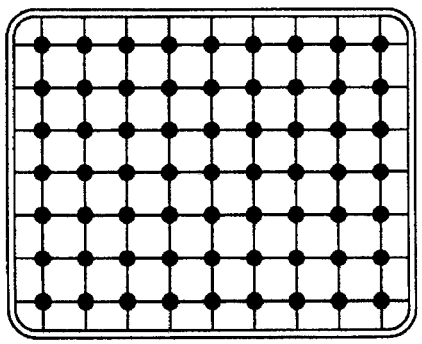
FIG. 27 is a view of a display screen on which a cross hatching signal is displayed in the conventional apparatus.

Next, the operation of the scanning waveform generating section 6 is described in detail as following with reference to FIG. 25.

It is noted here that similar parts in FIG. 25 in connection with FIG. 1 are denoted by the same reference numerals and the explanation thereof is omitted here.

In FIG. 25, various control signals such as remote control code signals are supplied to a microprocessor (CPU) 75 by way of an input terminal 77 for controlling the convergence correction and raster size, and the microprocessor 75 judges the remote control code signals to store the correction data in the memory 44 for various corrections. The correction data output from the memory 44 is supplied to both the multiplication type D/A converter 45 for convergence correction and another D/A converter 76 for controlling raster size. The D/A converter 45 is operated in the same manner as described above. The control signal output from the raster size D/A converter 76 is fed back to both the section 6 and the section 43 to form the scanning waveform and convergence correction waveform corresponding to the raster size. The scanning waveform generating section has the same construction as that of the first embodiment shown in FIGS. 20 and 21, which is remarkably effective in the digital control system using the D/A converters and memory.

According to the present invention as described above, by digitally forming a convergence correction waveform according to a scanning waveform corresponding to a scanning frequency and a raster size, reduction of the circuit scale and stabilization of the correction waveform can be assured thereby remarkably reducing the time for adjustment by virtue of the automatized adjustment arrangement. Furthermore, the data line amount can be remarkably reduced by using a serial input type digital-to-analog converter.

Although the above description has been made on the video projector for facilitating understanding of the present embodiment, it is of course effective for a shadow mask direct-viewing type television receiver. Although the above description has been made on the case where a convergence correction waveform is formed, the present invention may be applied to formation of another correction waveform.

Although the description has been made on the case where all the correction waveforms are processed in convergence correction according to the scanning frequency and aspect ratio in the first embodiment, each sawtooth waveform may be formed as a correction waveform from the scanning waveform generation means.

Although the description has been made on the case where each correction waveform is added in analog form in the second embodiment, the addition may be effected digitally.

According to the first inventive apparatus as described above, a convergence correction waveform is formed in accordance with the scanning frequency and the raster size so that the convergence can be corrected automatically following signal sources having different scanning frequencies and different aspect ratios thereby to allow a remarkable reduction of the adjustment time to be achieved.

Furthermore, in the present invention, by forming a correction waveform in a manner that the sawtooth waveform is proportional in amplitude to the control signal and the parabola waveform is proportional in amplitude to the square of the control signal, a high-accuracy convergence correction can be achieved even for a signal source having a different aspect ratio.

Further, in the first inventive apparatus, by detecting the scanning center position from a sawtooth waveform and forming divisional correction waveforms for the upper, lower, right, left, and four corner portions of the screen according to the detection signal, an improved correction accuracy can be achieved in the peripheral areas of the screen.

According to the second inventive apparatus, by digitally forming a convergence correction waveform from the scanning waveform corresponding to the scanning frequency and the raster size, an automatic adjustment can be achieved together with reduction of the circuit scale and stabilization of the correction waveforms to allow a remarkable reduction of the time for adjustment. By using a serial input type digital-to-analog converter, the data line amount can be remarkably reduced. With the abovementioned advantageous arrangement, the present invention is effective particularly for the video projector which manages a signal source having a different scanning frequency and a different aspect ratio, and therefore a great practical effect is obtained.

Although the present invention has been fully described by way of example with reference to the accompanying drawings, it is to be noted here that various changes and modifications will be apparent to those skilled the art. Therefore, unless otherwise such changes and modifications depart from the scope of the present invention as defined by the appended claims, they should be construed as included therein.

What is claimed is:

1. A convergence correction apparatus comprising:

scanning waveform generating means for generating a scanning waveform with receipt of a sync signal for scanning an electron beam in a cathode ray tube;

control means, which receives the scanning waveform and a control signal, for controlling a raster size in response to the scanning waveform; and correction waveform generating means, which receives the scanning waveform and the control signal, for generating a correction waveform in response to the scanning waveform and the control signal, wherein said correction waveform generating means further includes a feedback control means to generate the correction waveform having a sawtooth waveform component and a parabola waveform component where the sawtooth waveform component is proportional to a change in amplitude of the control signal and the parabola waveform component is proportional to the square of the chance in amplitude of the control signal.

2. The convergence correction apparatus as claimed in claim 1, wherein said correction waveform generation means generates a divisional correction waveform by detecting a scanning center position according to the sawtooth waveform.

3. A convergence correction apparatus comprising:

scanning waveform generating means for generating a scanning waveform with receipt of a sync signal for scanning an electron beam in a cathode ray tube;

control means for controlling the amplitude of the scanning waveform generated by said scanning waveform generating means thereby to control the raster size with receipt of a control signal;

fundamental correction waveform generating means for receiving the scanning waveform and the control signal and for generating a fundamental correction waveform for correcting the convergence in response to the scanning waveform and the control signal;

memory means for storing amplitude control data for controlling the amplitude of the fundamental correction waveform generated by said fundamental correction waveform generating means;

multiplication type digital-to-analog conversion means for effecting a multiplication type digital-to-analog conversion of the fundamental correction waveform with the amplitude control data supplied from said memory means; and correction waveform generating means for generating a correction waveform for correcting the convergence according to the digital-to-analog converted signal output by said multiplication type digital-to-analog conversion means.

\* \* \* \* \*

UNITED STATES PATENT AND TRADEMARK OFFICE
CERTIFICATE OF CORRECTION

PATENT NO. : 5,473,224
DATED : December 5, 1995
INVENTOR(S) : Tsujihara et al.

It is certified that error appears in the above-indentified patent and that said Letters Patent is hereby corrected as shown below:

Column 16, line 59, delete "chance" and insert --change--.

Signed and Sealed this

Twenty-third Day of July, 1996

Attest:

BRUCE LEHMAN

*Attesting Officer*     *Commissioner of Patents and Trademarks*